US012587970B2

(12) United States Patent
Moses et al.

(10) Patent No.: US 12,587,970 B2
(45) Date of Patent: Mar. 24, 2026

(54) DECIBEL COMPRESSION POINT INFORMATION REPORTING

(71) Applicant: QUALCOMM Incorporated, San Diego, CA (US)

(72) Inventors: Amit Moses, Tel Aviv (IL); Ronen Shaked, Kfar Saba (IL); Aviv Regev, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 18/461,264

(22) Filed: Sep. 5, 2023

(65) Prior Publication Data

US 2025/0081123 A1 Mar. 6, 2025

(51) Int. Cl.
*H04W 52/32* (2009.01)
*H04W 52/34* (2009.01)

(52) U.S. Cl.
CPC ......... *H04W 52/325* (2013.01); *H04W 52/34* (2013.01)

(58) Field of Classification Search
CPC ... H04W 52/32; H04W 52/325; H04W 52/34; H04L 1/0026; H04L 1/0029
See application file for complete search history.

(56) References Cited

U.S. PATENT DOCUMENTS

| | | | | | |
|---|---|---|---|---|---|
| 6,236,360 | B1 * | 5/2001 | Rudow | .............. | A63B 24/0021 |
| | | | | | 342/357.57 |
| 6,236,940 | B1 * | 5/2001 | Rudow | ................. | G01S 19/071 |
| | | | | | 701/300 |

| | | | | | |
|---|---|---|---|---|---|
| 7,184,490 | B1 * | 2/2007 | Rybicki | .................... | H03F 3/24 |
| | | | | | 375/295 |
| 7,299,021 | B2 * | 11/2007 | Rssinen | ................. | H04B 1/109 |
| | | | | | 375/345 |
| 7,555,059 | B2 * | 6/2009 | Rybicki | ................ | H03F 1/0277 |
| | | | | | 375/295 |
| 7,925,211 | B2 * | 4/2011 | Agarwal | ........... | H04B 7/18513 |
| | | | | | 370/318 |
| 9,866,259 | B1 * | 1/2018 | Margomenos | ........... | H04B 1/40 |
| 10,090,978 | B2 * | 10/2018 | Sun | ...................... | H04W 52/346 |
| 10,257,765 | B2 * | 4/2019 | Agee | ...................... | H04W 40/04 |
| 11,057,003 | B2 * | 7/2021 | Ripley | .................... | H03F 3/191 |

(Continued)

FOREIGN PATENT DOCUMENTS

| | | | | | |
|---|---|---|---|---|---|
| EP | | 4236439 A1 * | 8/2023 | ............. | H04W 24/10 |
| EP | | 4236457 A1 * | 8/2023 | ........ | H04W 36/0094 |

(Continued)

*Primary Examiner* — Hai V Nguyen
(74) *Attorney, Agent, or Firm* — QUALCOMM Incorporated

(57) ABSTRACT

This disclosure provides systems, methods, and devices for wireless communication that support compression point information reporting and enhanced power allocation operations. In a first aspect, a method of wireless communication includes receiving a reference signal and transmitting compression point information responsive to the reference signal, where the compression point information is determined based on the reference signal. The method of wireless communication further includes receiving a transmission responsive to the compression point information and in accordance with a power allocation based on the transmission of the compression point information. Other aspects and features are also claimed and described.

30 Claims, 10 Drawing Sheets

(56) References Cited

U.S. PATENT DOCUMENTS

| | | | | |
|---|---|---|---|---|
| 11,374,557 B2 * | 6/2022 | Jann | H03B 19/14 | |
| 11,463,124 B2 * | 10/2022 | Luo | H04B 1/525 | |
| 11,595,237 B1 * | 2/2023 | Yang | H04L 27/2621 | |
| 11,695,445 B2 * | 7/2023 | Muhammad | H04L 5/143 | |
| | | | 455/114.3 | |
| 11,716,233 B2 * | 8/2023 | Sahraei | H04L 27/2614 | |
| | | | 370/336 | |
| 11,728,954 B1 * | 8/2023 | Kutz | H04L 25/0242 | |
| | | | 375/267 | |
| 11,818,741 B2 * | 11/2023 | Horn | H04W 72/542 | |
| 11,831,579 B2 * | 11/2023 | Rajagopal | H04B 7/0456 | |
| 11,916,851 B2 * | 2/2024 | Gutman | H04W 52/243 | |
| 12,010,053 B2 * | 6/2024 | Khoryaev | H04L 27/2613 | |
| 12,034,531 B2 * | 7/2024 | Wei | H04L 1/0061 | |
| 12,063,598 B2 * | 8/2024 | Tang | H04W 72/0446 | |
| 12,096,371 B2 * | 9/2024 | Abotabl | H04B 17/24 | |
| 12,200,472 B2 * | 1/2025 | Ali | H04L 41/40 | |
| 12,250,693 B2 * | 3/2025 | Talarico | H04W 72/23 | |
| 12,445,335 B2 * | 10/2025 | Hosseini | H04W 16/14 | |
| 2004/0095907 A1 * | 5/2004 | Agee | H04B 7/10 | |
| | | | 370/400 | |
| 2008/0086668 A1 * | 4/2008 | Jefferson | G01R 31/2848 | |
| | | | 714/741 | |
| 2009/0221317 A1 * | 9/2009 | Agarwal | H04B 7/2125 | |
| | | | 455/522 | |
| 2014/0155128 A1 * | 6/2014 | Dakshinamurthy | | |
| | | | H04W 52/0209 | |
| | | | 455/574 | |
| 2014/0206367 A1 * | 7/2014 | Agee | H04B 7/06952 | |
| | | | 455/450 | |
| 2014/0328423 A1 * | 11/2014 | Agee | H04W 52/42 | |
| | | | 375/267 | |
| 2016/0065328 A1 * | 3/2016 | Stopler | H04J 11/0046 | |
| | | | 375/260 | |
| 2016/0366003 A1 * | 12/2016 | Kwon | H04W 72/0473 | |
| 2017/0012754 A1 * | 1/2017 | Sun | H04W 72/541 | |
| 2018/0192349 A1 * | 7/2018 | Agee | H04B 7/0443 | |
| 2018/0220399 A1 * | 8/2018 | Davydov | H04L 1/0026 | |
| 2019/0273470 A1 * | 9/2019 | Rogers | H03F 3/72 | |
| 2019/0378235 A1 * | 12/2019 | Kamath | H04N 1/3232 | |
| 2020/0145924 A1 * | 5/2020 | Tang | H04L 5/0053 | |
| 2020/0389203 A1 * | 12/2020 | Luo | H04B 1/40 | |
| 2021/0067391 A1 * | 3/2021 | Sengupta | H04L 27/2614 | |
| 2021/0377090 A1 * | 12/2021 | Sahraei | H04W 72/0446 | |
| 2021/0391853 A1 * | 12/2021 | Jann | H03B 5/12 | |
| 2022/0045713 A1 * | 2/2022 | Muhammad | H04B 1/0475 | |
| 2022/0400493 A1 * | 12/2022 | Horn | H04W 72/542 | |
| 2023/0065202 A1 * | 3/2023 | Pehlke | H03F 3/195 | |
| 2023/0164701 A1 * | 5/2023 | Fakoorian | H04L 5/0053 | |
| | | | 455/522 | |
| 2023/0283443 A1 * | 9/2023 | Kutz | H04L 25/0212 | |
| | | | 375/267 | |
| 2023/0291630 A1 * | 9/2023 | Hosseini | H04W 16/14 | |
| 2023/0345378 A1 * | 10/2023 | Abotabl | H04B 17/24 | |
| 2024/0030578 A1 * | 1/2024 | Pehlke | H03F 3/195 | |
| 2024/0147471 A1 * | 5/2024 | Islam | H04W 72/51 | |
| 2024/0171241 A1 * | 5/2024 | Lu | H04B 7/0456 | |
| 2024/0187071 A1 * | 6/2024 | Li | H04W 24/10 | |
| 2024/0196178 A1 * | 6/2024 | Ying | H04W 8/18 | |
| 2024/0244595 A1 * | 7/2024 | Wang | H04L 5/0094 | |
| 2024/0311621 A1 * | 9/2024 | Kumaraswamy | G06N 3/045 | |
| 2024/0365322 A1 * | 10/2024 | Islam | H04W 72/20 | |
| 2024/0406797 A1 * | 12/2024 | Sen | H04L 1/0061 | |
| 2024/0414067 A1 * | 12/2024 | Yao | H04L 41/16 | |
| 2024/0422511 A1 * | 12/2024 | Rao | H04W 4/08 | |
| 2025/0038775 A1 * | 1/2025 | Kutz | H04L 5/0048 | |
| 2025/0039798 A1 * | 1/2025 | Kutz | H04W 52/367 | |
| 2025/0088984 A1 * | 3/2025 | Venugopal | H04W 52/22 | |
| 2025/0254629 A1 * | 8/2025 | Zorgui | H04W 64/00 | |
| 2025/0266957 A1 * | 8/2025 | Krips | H04L 5/0039 | |

FOREIGN PATENT DOCUMENTS

| | | | | |
|---|---|---|---|---|
| WO | WO-2023140767 A1 * | 7/2003 | | G06N 3/0455 |
| WO | WO-2016034944 A1 * | 3/2016 | | H04L 1/005 |
| WO | WO-2025029393 A1 * | 2/2025 | | H04L 5/0048 |

* cited by examiner $$X_1^{nl} = \frac{1}{\sqrt{2}}X_1 + NL_{PA_1}\left(\frac{1}{\sqrt{2}}X_1\right)$$

$$X_2^{nl} = \frac{1}{\sqrt{2}}X_2 + NL_{PA_2}\left(\frac{1}{\sqrt{2}}X_2\right)$$

322

324

312

314

Precoder 302

$S_j$

300

1dB Compression-Point Comparison for Different PA

Optimal Gain 392
PA₁ Gain 394
PA₂ Gain 396

Output Power [dBm]

Input Power [dBm]

390

392  394  396  398  399

400

105

115

510 Config. Operations

515 Ref. Signal (e.g., CSI-RS) with high PAPR

520 Determine PA Transfer Function

525 Determine P1dB

530 P1dB Report (e.g., CSF Report)

535 Determine PA

540 Control TX

545 DL TX w/ new PA

550 Operations

500

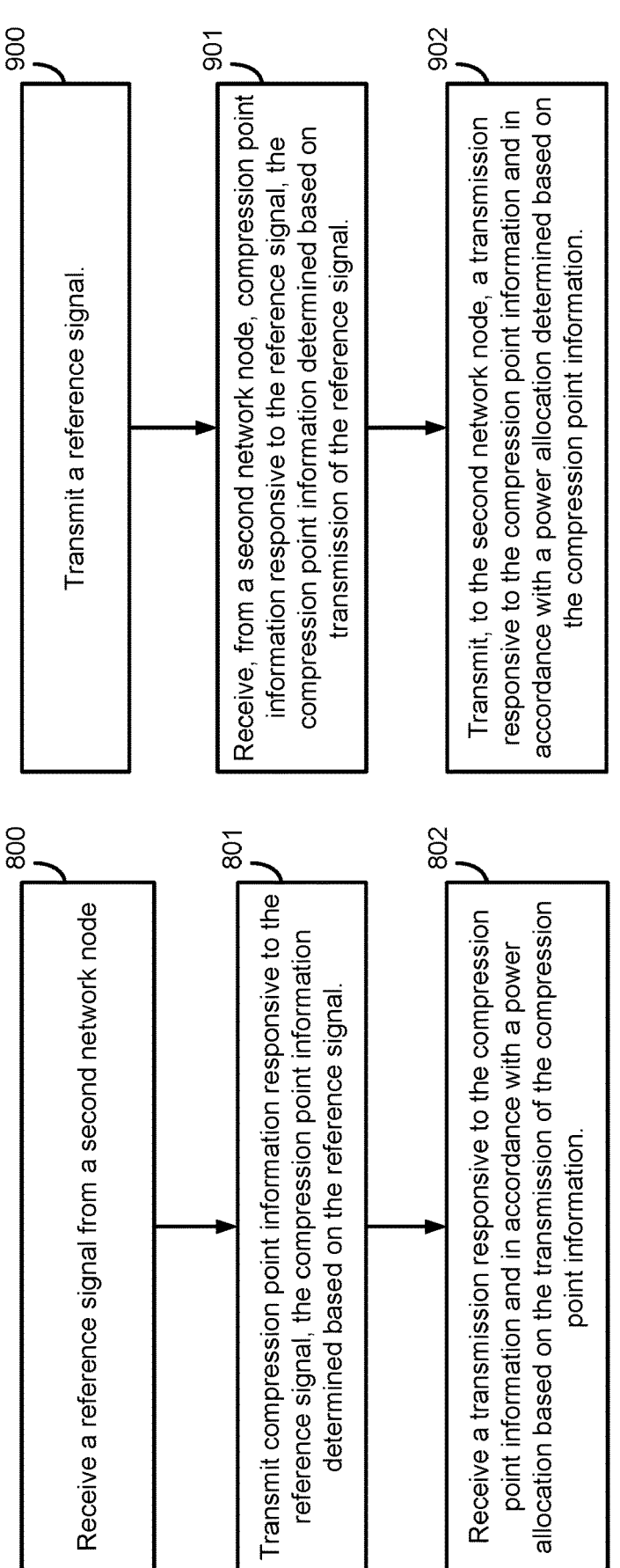

900 Transmit a reference signal.

901 Receive, from a second network node, compression point information responsive to the reference signal, the compression point information determined based on transmission of the reference signal.

902 Transmit, to the second network node, a transmission responsive to the compression point information and in accordance with a power allocation determined based on the compression point information.

FIG. 9

800 Receive a reference signal from a second network node

801 Transmit compression point information responsive to the reference signal, the compression point information determined based on the reference signal.

802 Receive a transmission responsive to the compression point information and in accordance with a power allocation based on the transmission of the compression point information.

FIG. 8

DECIBEL COMPRESSION POINT INFORMATION REPORTING

TECHNICAL FIELD

Aspects of the present disclosure relate generally to wireless communication systems, and more particularly, to enhanced reporting of decibel compression point information. Some features may enable and provide improved communications, including enhanced transmission power allocation based on decibel compression point information.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Power amplifiers used in transmit chains may introduce distortion when amplifying signals for wireless transmission. Distortion may be calculated or indicated in many ways. One such measurement of distortion is decibel compression point information, which indicates the onset of distortion from signal amplification, such as the onset of non-linear distortion. Such non-linear distortion may be referred to as non-linearity of the amplifier or of the amplified signal.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes receiving a reference signal and transmitting compression point information responsive to the reference signal, where the compression point information is determined based on the reference signal. The method of wireless communication further includes receiving a transmission responsive to the compression point information and in accordance with a power allocation based on the transmission of the compression point information.

In an additional aspect of the disclosure, an apparatus includes at least one processor and a memory coupled to the at least one processor. The at least one processor is configured to cause the apparatus to: receive, from a second network node, a reference signal; transmit compression point information responsive to the reference signal, wherein the compression point information is determined based on the reference signal; and receive a transmission responsive to the compression point information and in accordance with a power allocation based on the transmission of the compression point information.

In an additional aspect of the disclosure, an apparatus includes means for receiving a reference signal; means for transmitting compression point information responsive to the reference signal, where the compression point information is determined based on the reference signal; and means for receiving a transmission responsive to the compression point information and in accordance with a power allocation based on the transmission of the compression point information.

In an additional aspect of the disclosure, a non-transitory computer-readable medium stores instructions that, when executed by a processor, cause the processor to perform operations. The operations include: receiving a reference signal; transmitting compression point information responsive to the reference signal, where the compression point information is determined based on the reference signal; and receiving a transmission responsive to the compression point information and in accordance with a power allocation based on the transmission of the compression point information.

In another aspect of the disclosure, a method for wireless communication includes: transmitting a reference signal; receiving, from a second network node, compression point information responsive to the reference signal, wherein the compression point information is determined based on the transmission of the reference signal; and transmitting a transmission responsive to the compression point information and in accordance with a power allocation determined based on the compression point information.

In an additional aspect of the disclosure, an apparatus includes at least one processor and a memory coupled to the at least one processor. The at least one processor is configured to cause the apparatus to: transmit a reference signal; receive, from a second network node, compression point information responsive to the reference signal, wherein the compression point information is determined based on the transmission of the reference signal; and transmit a transmission responsive to the compression point information and in accordance with a power allocation determined based on the compression point information.

In an additional aspect of the disclosure, an apparatus includes means for transmitting a reference signal; means for receiving, from a second network node, compression point information responsive to the reference signal, wherein the compression point information is determined based on the transmission of the reference signal; and means for transmitting a transmission responsive to the compression point information and in accordance with a power allocation determined based on the compression point information.

In an additional aspect of the disclosure, a non-transitory computer-readable medium stores instructions that, when executed by a processor, cause the processor to perform operations. The operations include: transmitting a reference signal; receiving, from a second network node, compression point information responsive to the reference signal, wherein the compression point information is determined based on the transmission of the reference signal; and transmitting a transmission responsive to the compression point information and in accordance with a power allocation determined based on the compression point information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 8 is a flow diagram illustrating an example process that supports enhanced compression point information reporting according to one or more aspects.

FIG. 9 is a flow diagram illustrating an example process that supports enhanced compression point information reporting according to one or more aspects.

Like reference numbers and designations in the various drawings indicate like elements.

DETAILED DESCRIPTION

Figure 1:
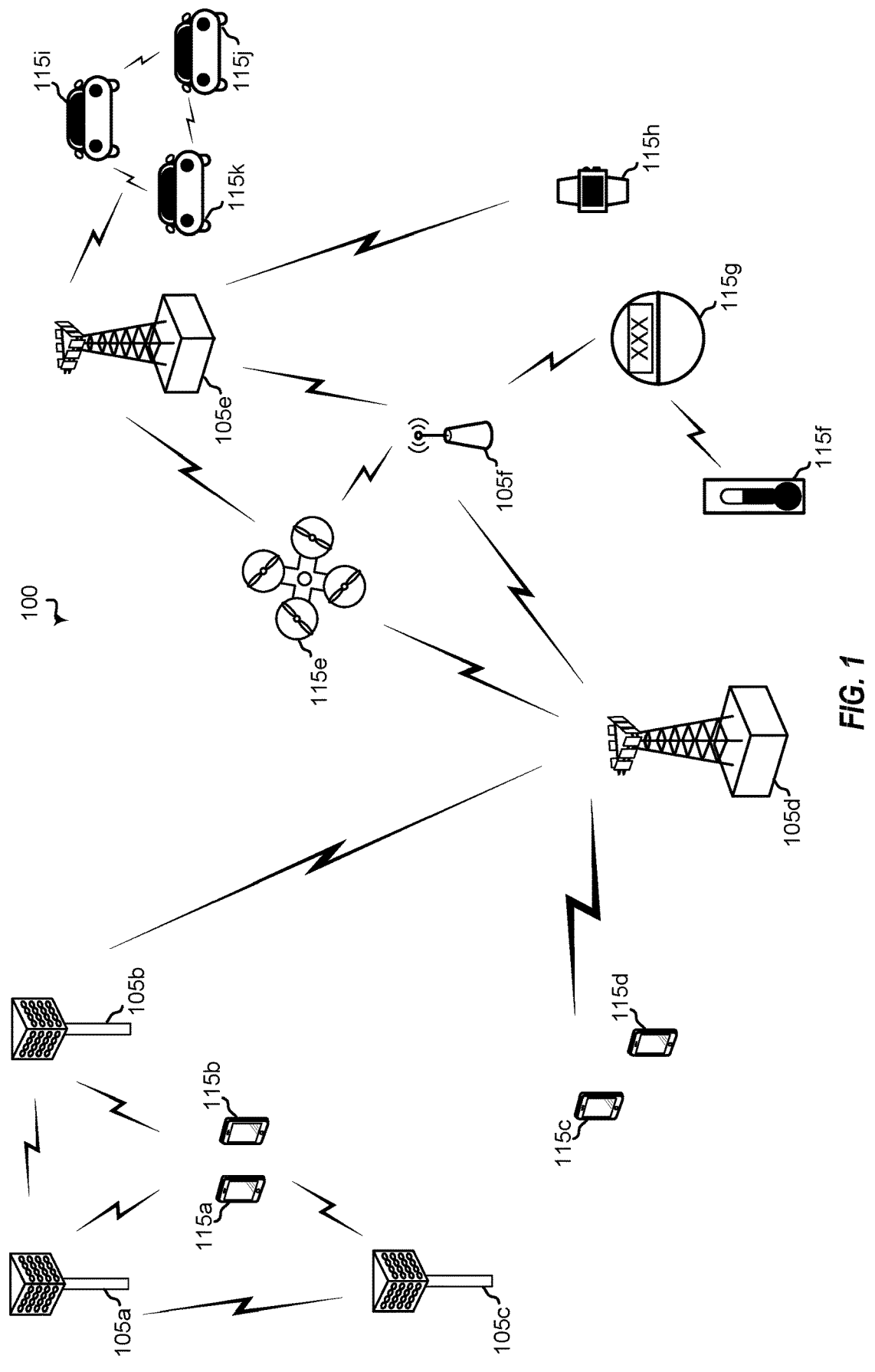
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or partici-pating in authorized shared access between two or more wireless devices in one or more wireless communications systems, also referred to as wireless communications net-works. In various implementations, the techniques and appa-ratus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Gen-eration (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wide-band-CDMA (W-CDMA) and low chip rate (LCR). CDMA2000 covers IS-2000, IS-95, and IS-856 standards.

A TDMA network may, for example implement a radio technology such as Global System for Mobile Communica-tion (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's net-work may comprise one or more GERANs, which may be coupled with UTRANs in the case of a UMTS/GSM net-work. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommu-nications associations that aims to define a globally appli-cable third generation (3G) mobile phone specification. 3GPP LTE is a 3GPP project which was aimed at improving UMTS mobile phone standard. The 3GPP may define speci-fications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified infor-mation, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capac-ity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromag-netic spectrum. The electromagnetic spectrum is often sub-divided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (inter-changeably) as a "sub-6 GHz" band in various documents and articles. A similar nomenclature issue sometimes occurs with regard to FR2, which is often referred to (interchange-ably) as a "millimeter wave" (mmWave) band in documents and articles, despite being different from the extremely high frequency (EHF) band (30 GHz-300 GHz) which is identi-fied by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequen-cies, may be within FR2, or may be within the EHF band.

5G NR devices, networks, and systems may be imple-mented to use optimized OFDM-based waveform features. These features may include scalable numerology and trans-mission time intervals (TTIs); a common, flexible frame-work to efficiently multiplex services and features with a dynamic, low-latency time division duplex (TDD) design or frequency division duplex (FDD) design; and advanced wireless technologies, such as massive multiple input, mul-tiple output (MIMO), robust mmWave transmissions, advanced channel coding, and device-centric mobility. Scal-ability of the numerology in 5G NR, with scaling of sub-carrier spacing, may efficiently address operating diverse services across diverse spectrum and diverse deployments. For example, in various outdoor and macro coverage deployments of less than 3 GHz FDD or TDD implemen-tations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mm Wave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105c.

Figure 2:
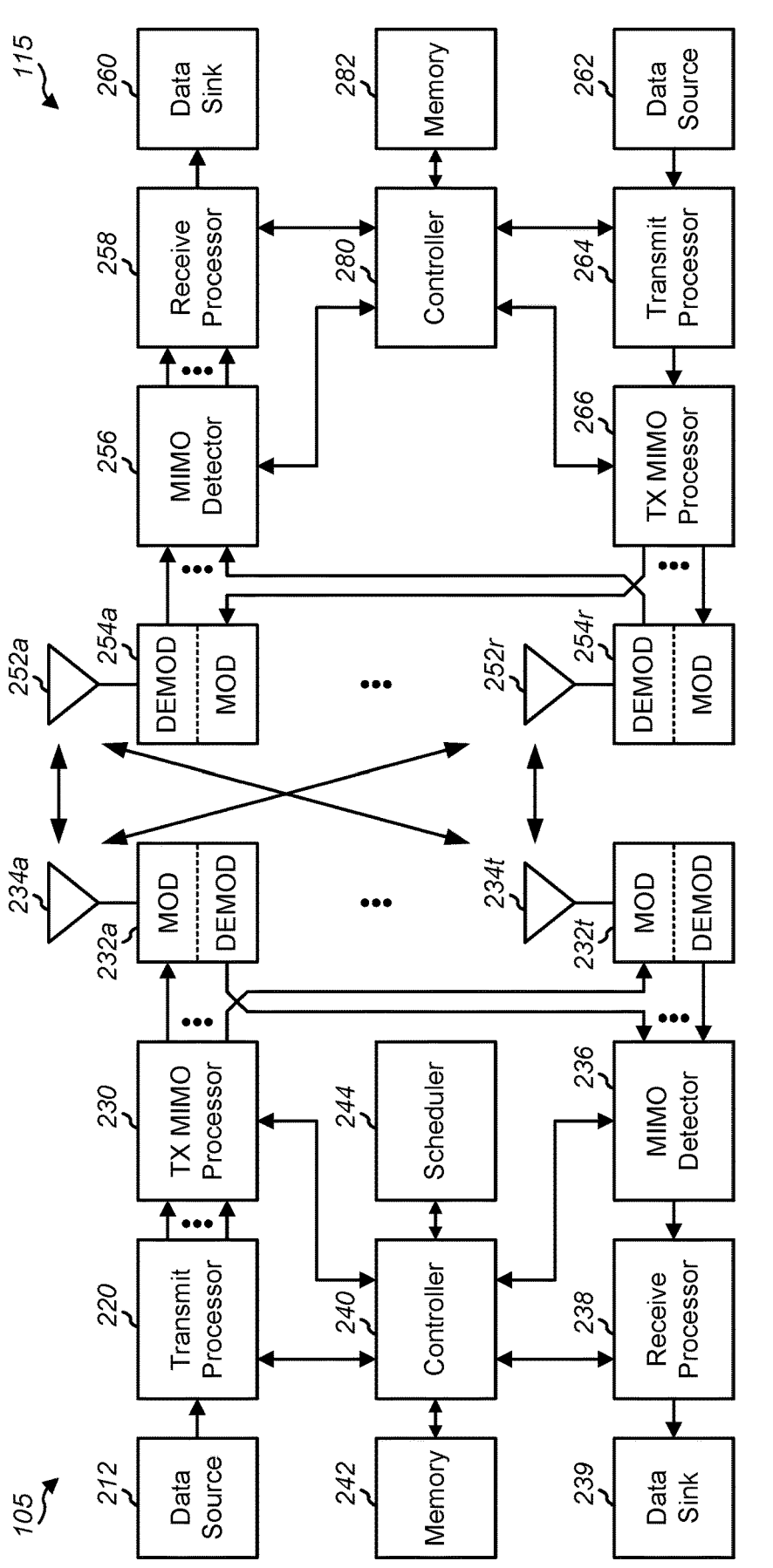
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 8 and 9, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum.

For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figures 3A, 3B:
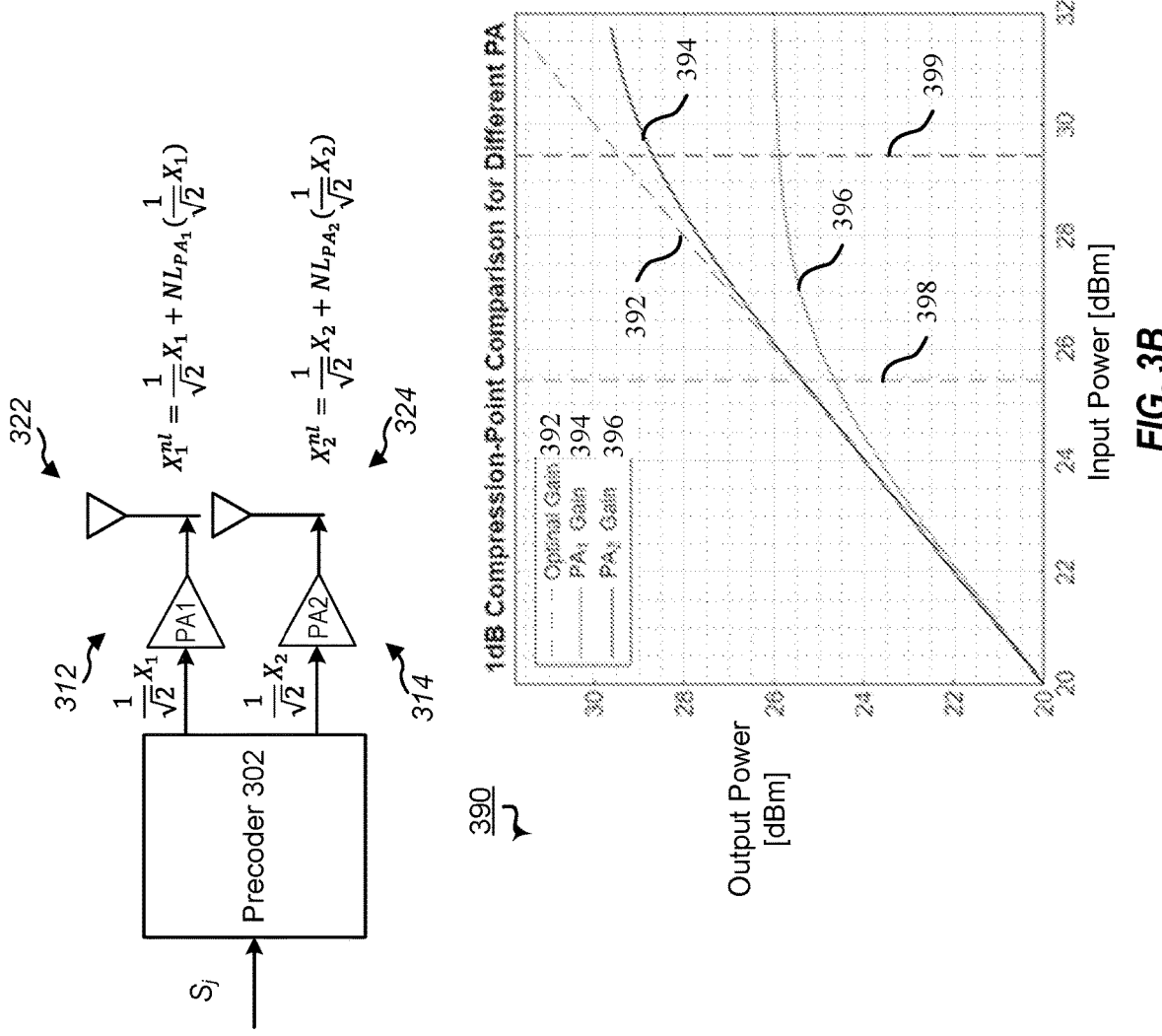
FIG. 3A is a diagram of an example of power allocation operations according to one or more aspects.
FIG. 3B is a diagram of an example of graph illustrating compression point information for different power amplifiers according to one or more aspects.

Referring to FIG. 3A, FIG. 3A illustrates an example of power allocation operations (equal power allocation operations) for a transmitting device 300. In FIG. 3A, the transmitting device 300 includes a precoder 302 and a plurality of transmit chains. Each transmit chain includes an amplifier and an antenna. For example, the first transmit chain includes a first PA 312 and a first antenna 322, and the second transmit chain includes a second PA 314 and a second antenna 324. Each transmit chain may include additional elements or circuitry not shown for simplicity.

The precoder 302 is configured to precode data. For example, the precoder 302 is configured to generate precoded data based on input data, such as raw or unprecoded data. To illustrate, the precoder 302 is configured to generate and/or apply weights to a signal to generate precoded signal. The precoded signal may be a beamformed, directional, or steered signal.

The PAs are configured to amplify a signal. For example, the first PA 312 is configured to amplify a first precoded signal and the second PA 314 is configured to amplify a second precoded signal. The PAs may generate, alter, or distort the signal upon amplification, such as generate non-linearity or non-linear distortion. For example, the amplified signal may be shifted from the input signal. To illustrate, for an input sine wave signal the amplified signal may not have the same sine wave shape or a perfect sine wave shape.

The antennas are configured to wirelessly transmit amplified signals. For example, the first antenna 322 is configured to transmit a first amplified signal processed by the first transmit chain and the second antenna 324 is configured to transmit a second amplified signal processed by the second transmit chain.

During operation, the precoder 302 receives information to be precoded. The precoder may precode the information and generate two precoded outputs. The precoded outputs may be provided to respective transmit chains. For example, a first precoded output is provided to the first PA 312 of the first transmit chain and a second precoded output is provided to the second PA 314 of the second transmit chain. The precoder 302 may be configured to generate multiple outputs based on a single input or based on multiple inputs.

Each PA amplifies its received precoded output and provides it to its respective antenna for transmission. For example, the amplified first precoded output is provided to the first antenna 322 of the first transmit chain and the amplified second precoded output is provided to the second antenna 324 of the second transmit chain.

In FIG. 3A, an example equation is illustrated for non-linearity for equal power distribution operations. Data (e.g., unprecoded data) Sj is provided to the precoder 302. The precoder 302 operates with equal power and generates two outputs based on the data, one for each antenna or layer, and the total power for each output is the same, Xi divided by the square root of two. The respective power amplifiers each add non-linearity and distortion based on the input data and the transfer function. The non-linearity of the resulting signal (not accounting for gain) is given by the equation in FIG. 3A, where the non-linearity of the signal after power amplification is the original non-linearity after precoding plus a sum of the non-linearity after precoding multiplied by the non-linearity of the power amplifier ($NL_{PA}$). The example of FIG. 3A corresponds to a single layer example for two transmitting antennas.

As in conventional systems, each PA amplifies the received signals to the same extent and each transmit chain transmits with the same power allocation. Accordingly, if there are differences between the PAs or transmit chains, the distortion between the transmitted signals may be different. The different levels of distortion may cause a receiving device to have processing errors and/or require the receiving device to perform distortion reducing processing operations, such as DPD and/or DPOD. The distortion reducing processing operations utilize additional power and processing time.

Referring to FIG. 3B, FIG. 3B illustrates an example of compression point information for different power amplifiers. FIG. 3B depicts an example of 1 decibel compression points for power amplifiers of different transmit chains. FIG. 3B is a graph illustrating output power plotted against input power for PAs of two transmit chains.

In FIG. 3B, output power, in dBm, is plotted on a vertical axis and input power, in dBm, is plotted on a horizontal axis for two power amplifiers, a first power amplifier (PA1) of a first transmit chains and a second power amplifier (PA2) of a second transmit chains. The PAs may include or correspond to the first and second PAs 312 and 314 of FIG. 3A.

For each PA 312, 314, FIG. 3B depicts curves or functions between input power to the PA and output power from the PA (or transmit chain). As PAs have a liner amplification range and a non-linear amplification range, a plot of input power vs output power has a close or linear correlation in a first portion (left) of the graph, and a diverging or non-linear correlation in a second portion (right) of the graph. To illustrate, as an input power increases (from right to left in FIG. 3B) the spread between the input power and output power increases.

In FIG. 3B, an optimal or linear gain line 392 is illustrated which has no non-linear distortion, and corresponding gain curves for the first and second PAs are illustrated, a first gain curve 394 for the first PA (PA1) and a second gain curve 396 for the second PA (PA2). Additionally, two vertical dashed lines are further illustrated which depict the corresponding 1 decibel compression points for the PAs. Specifically, a first 1 decibel compression point line 398 for the first PA (PA1) and a second 1 decibel compression point line 399 for the second PA (PA2). The first 1 decibel compression point line 398 has a value of about 25.5 dBm and corresponds to a value where the output power diverges from the input power (and the optional gain line) by 1 dB for the first PA (PA1). The second 1 decibel compression point line 399 has a value of about 29.5 dBm and corresponds to a value where the output power diverges from the input power (and the optional gain line) by 1 dB for the second PA (PA2).

As the second PA has a higher 1 decibel compression point line, the second PA can handle higher gains or transmit power without or with less non-linear distortion as compared to the first PA. However, when transmitting with equal power allocations (as shown in FIG. 3A and as in conventional networks) the difference in the PAs or transmit chains can cause issues. For example, each PA may need to use a lower gain to reduce or avoid non-linear distortion. As another example, one PA may experience higher non-linear distortion when using gain or transmit power which is within the linear range of another PA/transmit chain.

In addition, even when operating with unequal power allocations, a transmitting device may still experience non-linear distortion issues due to PA and transmit chain differences. For example, without compression point information, more accurate compression point information, or compression point information per PA/transmit chain, a transmitting device may not be able to accurately allocate power to more fully take advantage of the linear region of each of its PA/transmit chains. As another example, PA degradation over time or at some operating conditions (e.g., temperature) may cause changes in the compression point of one or more PAs, which may be compensated for by compression point information reporting.

In the aspects described herein, enhanced reporting of compression point information and power allocations operations and schemes are disclosed to reduce errors, processing latency, and power consumption to provide for better user experience and to satisfy the requirements of demanding reduced latency or emergency operational modes. In the aspects described herein, compression point information is generated based on received reference signal information, and the compression point indicates distortion for particular transmit chains of the transmitting device. The compression point information is reported back to the transmitting device to be used in enhanced power allocation determination operations. The enhanced power allocation determination operations may enable power allocation on a per transmit chain or PA basis to reduce distortion and enable distributed or unequal power allocations. Dynamic and/or distributed power allocation operations enables devices to adapt to changing operational conditions and improve power allocations to take advantage of compression point differences between transmit chains.

Figure 4:
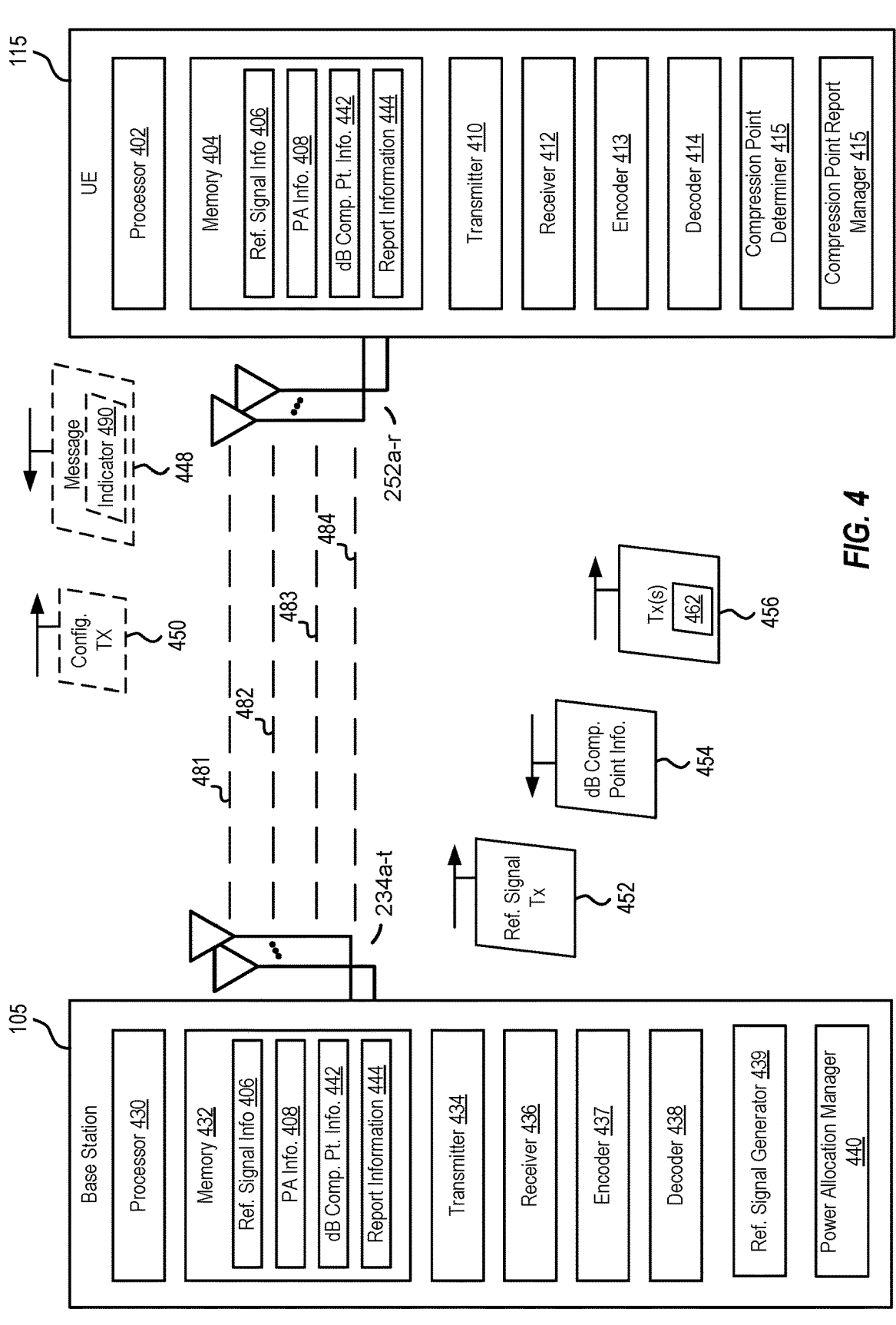
FIG. 4 is a block diagram illustrating an example wireless communication system that supports enhanced compression point information reporting according to one or more aspects.

FIG. 4 illustrates an example of a wireless communications system 400 that supports compression point information reporting and enhanced power allocation operations in accordance with aspects of the present disclosure. In some examples, wireless communications system 400 may implement aspects of wireless network 100. For example, wireless communications system 400 may include a network, such as one or more network entities, and one or more UEs, such as UE 115. As illustrated in the example of FIG. 4, the network entity includes a corresponds to a base station, such as base station 105. Alternatively, the network entity may include or correspond to a different network device (e.g., not a base station). Enhanced compression point information reporting and power allocation operations may reduce latency and failures, such as due to reduced transmit-side generated distortion and/or reduced receive-side distortion processing. These improvements may also reduce power consumption by reduced distortion processing and may improve connection quality by enabling increased transmit power and/or reducing transmission failures. Accordingly, network and device performance can be increased.

Base station 105 and UE 115 may be configured to communicate via one or more portions of the electromagnetic spectrum. The electromagnetic spectrum is often sub-divided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (inter-changeably) as a "sub-6 GHz" band in various documents and articles. A similar nomenclature issue sometimes occurs with regard to FR2, which is often referred to (interchange-ably) as a "mmWave" band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequen-cies, may be within FR2, or may be within the EHF band.

It is noted that SCS may be equal to 15, 30, 60, or 120 kHz for some data channels. Base station 105 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configu-ration, such as configuration parameters/settings. The peri-odic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, or a Bandwidth Part (BWP) ID. The Cell ID may include a unique cell ID for the CC, a virtual Cell ID, or a particular Cell ID of a particular CC of the plurality of CCs. Addi-tionally, or alternatively, one or more CCs may have or be assigned to a HARQ ID. Each CC may also have corre-sponding management functionalities, such as, beam man-agement or BWP switching functionality. In some imple-mentations, two or more CCs are quasi co-located, such that the CCs have the same beam and/or same symbol.

In some implementations, control information may be communicated via base station 105 and UE 115. For example, the control information may be communicated using MAC-CE transmissions, RRC transmissions, DCI (downlink control information) transmissions, UCI (uplink control information) transmissions, SCI (sidelink control information) transmissions, another transmission, or a com-bination thereof.

UE 115 can include a variety of components (e.g., struc-tural, hardware components) used for carrying out one or more functions described herein. For example, these com-ponents can includes processor 402, memory 404, transmit-ter 410, receiver 412, encoder, 413, decoder 414, compres-sion point information determiner 415, compression point information reporting manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store reference signal information 406, PA information 408, compression point information 442, report information 444, settings data (e.g., report configu-ration information), or a combination thereof, as further described herein.

The reference signal information 406 includes or corre-sponds to data associated with or corresponding to a refer-ence signal. For example, the reference signal information 406 may include data for a sequence of pilot signals or tones for measuring power allocation information and/or compres-sion point information.

The reference signal information 406 may be included in a control channel transmission (e.g., PDCCH or DCI) and/or may correspond to CSI-RS or other unprecoded reference signal in some implementations. Alternatively, the reference signal information 406 may be included in a configuration transmission (e.g., RRC).

Additionally, or alternatively, the reference signal infor-mation 406 may indicate or include or correspond to a reference signal with high PAPR, as described further herein. The reference signal information 406 may include multiple version of reference signals (e.g., legacy and com-pression point specific reference signal).

The power allocation information 408 includes or corre-sponds to data associated with or corresponding to power allocations. For example, the power allocation information 408 may include or correspond to power allocation rule information, power allocation or distribution information, or transmit power. The power allocation information 408 may indicate a power allocation on a per device, per transmis-sion, and/or per TX chain basis. For example, the power allocation may include different transmit allocations or powers for a transmission at one time per transmit chain. The power allocation may be indicated by a bitmap in some implementations, such as with a field for each transmit chain indicating a corresponding transmit power or PA gain.

The compression point information 442 includes or cor-responds to data associated with or corresponding to com-pression point information generation and/or reporting. For example, the compression point information 442 may include or correspond to information used to determine a compression point, information indicating a compression point, or both. Information used to determine a compression point may include one or more of received power, expected power, input power, estimated power, a transmission power setting, a gain setting, or transfer function information. Information indicating a compression point may include information indicating a value of a compression point for a particular PA or transmit chain.

In some implementations, the compression point infor-mation 442 includes compression point information for a report or reporting information, such as compression point report or a CSF report including compression point information. Similar to the power allocation information 408, the compression point information 442 (e.g., report information) may be determined or indicated per transmit chain or per PA.

The report information 444 (e.g., CSF report or compression point information report) includes or corresponds to data indicating or corresponding to a report for reporting compression point information. For example, the report information 444 may include or correspond to a compression point information report, such as a CSF report with compression point information or a dedicate compression point information report.

A compression point information report may include or be generated based on the PA information 408, the compression point information 442, or both. To illustrate, a compression point information report may include, for each PA or transmit channel, an indication of an amount gain or transmit power than can be applied before a threshold amount of distortion or linearity is expected. Additionally, or alternatively, the UE 115 may include other information in the report, such as distortion information. In some implementations, the compression point information report may be generated based on priority information for the PAs or transmit channels.

In some implementations, the report information 444 includes or corresponds to an aperiodic compression point information report, such as an aperiodic or dynamically trigger report. In such implementations, a timing of the aperiodic compression point information report is based on the timing of the DCI and may be indicated by the DCI, or configured by RRC and then determined based on DCI. The report information 444 (e.g., the aperiodic compression point information report) may be mixed with or jointly indicated with other types of information, such as with CSI, CSF information, HARQ-ACK information, or a combination thereof.

The report information 444 may include or correspond to report configuration information (e.g., compression point or CSF report or reporting configuration information). For example, the report configuration information may include or correspond to data indicating or corresponding to compression point information report or reporting configurations and/or schemes. For example, the report configuration information may include or correspond to report timing information, report type information, report format information, report history length, report resource information, report threshold information, transmit chain information, PA information, or a combination thereof.

The settings data includes or corresponds to data associated with enhanced compression information reporting operations and/or enhanced power allocation operations. The settings data may include one or more types of enhanced compression information reporting operation modes and/or enhanced power allocation operation modes and/or thresholds or conditions for switching between enhanced compression information reporting modes and/or enhanced power allocation modes and/or configurations thereof. For example, the settings data may have data indicating different thresholds and/or conditions for different enhanced compression information reporting modes and/or enhanced power allocation modes, aperiodic modes, semi-static modes, periodic modes, etc., or a combination thereof.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410 or receiver, 412 may include or correspond to one or more components of UE 115 described with reference to FIG. 2.

Encoder 413 and decoder 414 may be configured to encode and decode data for transmission. Compression point information determiner 415 may be configured to perform compression point determination and management operations. For example, compression point information determiner 415 may be configured to determine compression point information for transmitting devices, such as for power amplifiers and/or transmit chains thereof. The compression point information determiner 415 may be configured to measure reference signal(s) and/or determine received and/or expected power for the reference signals, such as for tones thereof. To illustrate, the compression point information determiner 415 may be configured to determine PA information 408, compression point information 442, or both, based on reference signal information 406.

Compression point information report manager 416 may be configured to perform compression point information reporting operations, such as report configuration, report generation, and report transmission operations. For example, compression point information report manager 416 may be configured to generate the report information 444 based on the PA information 408, the compression point information 442, or both, according to a report configuration indicated by report configuration information (e.g., indicated by the configuration transmission 450). Optionally, the compression point information report manager 416 may be configured to determine in which uplink resources (e.g., which uplink transmissions or transmissions) to transmit the compression point information 442 and/or the report information 444.

Although one UE is shown in the example of FIG. 4, in other implementation the network may include additional UEs. The other UE or UEs may include one or more elements similar to UE 115. In some implementations, the UE 115 and the other UE or UEs are different types of UEs. For example, either UE may be a higher quality or have different operating constraints. To illustrate, one of the UEs may have a larger form factor or be a current generation device, and thus have more advanced capabilities and/or reduced battery constraints, higher processing constraints, etc.

Base station 105 includes processor 430, memory 432, transmitter 434, receiver 436, encoder 437, decoder 438, reference signal generator 439, power allocation manager 440, and antennas 234*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store reference signal information 406, PA information 408, compression point information 442, report information 444, settings data (e.g., report configuration information), or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, UEs and/or base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434 or receiver, 436 may include or correspond to one or more components of UE 115 described with reference to FIG. 2.

Encoder 437, and decoder 438 may include the same functionality as described with reference to encoder 413 and decoder 414, respectively. Reference signal generator 439 may be configured to perform reference signal generation and management operations. For example, reference signal generator 439 may be configured to determine reference signal information for determination of compression point information. The reference signal information may include high PAPR reference signal information and be configured to enable a receiving device to determine a transfer function of the expected and received power for the reference signal information. The reference signal generator 439 may be configured to generate reference signal information 406. In some implementations, the reference signal generator 439 is configured to generate a high PAPR reference signal or to determine if a conventional reference signal satisfies a high PAPR condition.

Power allocation manager 440 may include may be configured to perform power allocation determination and management operations. For example, the power allocation manager 440 may be configured to determine power allocation information for the base station 105, such as for power amplifiers and/or transmit chains thereof. The power allocation manager 440 may be configured to determine a power allocation, such as a power allocation of FIG. 6A, 6B, or 7, based on received compression point information 442 and/or PA information 408.

In some implementations, the base station 105 may include similar functionality as described with reference to the compression point information determiner 415, the compression point information reporting manager 416, or both, of the UE 115. Additionally, or alternatively, the UE 115 may include similar functionality as described with reference to the reference signal generator 439, the power allocation manager 440, or both, of the base station 105.

During operation of wireless communications system 400, the network (e.g., base station 105) may determine that UE 115 has compression point information reporting capability. For example, UE 115 may transmit a message 448 that includes a compression point information reporting indicator 490 (e.g., an enhanced power allocation indicator). Indicator 490 may indicate compression point information reporting capability or enhanced power allocation capability for one or more communication modes, such as uplink, downlink, sidelink, etc. In some implementations, a network entity (e.g., a base station 105) sends control information to indicate to UE 115 that compression point information reporting operation and/or a particular type of compression point information reporting operation is to be used. For example, in some implementations, configuration transmission 450 is transmitted to the UE 115. The configuration transmission 450 may include or indicate to use compression point information reporting operations or enhanced power allocation determination operations or to adjust or implement a setting of a particular type of compression point information reporting operation or enhanced power allocation determination operation. For example, the configuration transmission 450 may include PA information 408, report configuration information (e.g., compression information report configuration information), settings data, or any combination thereof.

During operation, devices of wireless communications system 400 perform compression point information reporting operations and enhanced power allocation operations. For example, the network and UEs may exchange transmissions via uplink, downlink, and/or sidelink communications over the communication links and engage in compression point information reporting operations and enhanced power allocation operations, as illustrated in the example of FIG. 4. Compression point information reporting operations enables enhanced power allocation operations, such as the determination of distributed or unequal power allocations across transmit chains of a device and/or power allocations that reduce distortion (e.g., PA distortion) as compared to a prior transmission. The enhanced power allocation operations enable receiving devices to reduce failures due to transmit side generated distortion and reduce receive-side distortion processing.

In the example of FIG. 4, the base station 105 transmits a reference signal transmission 452 to the UE 115 including reference signal information 406. The base station 105, such as the reference signal generator 439 thereof, may generate a reference signal with high PAPR or determine if a candidate reference signal satisfies a PAPR condition. For example, the base station 105 may generate the reference signal transmission 452 based on or including reference signal information 406 and transmit the reference signal transmission 452 to one or more UEs, including the UE 115. To illustrate, the base station 105 may transmit a CSI-RS. In some implementations, the reference signal transmission is a control channel transmission. In other implementations, the reference signal transmission includes or corresponds to a data transmission and the reference signal information 406 includes or corresponds to pilot signals or tones thereof. The reference signal transmission 452 may include or correspond to broadcast message, a RRC message, a DCI transmission, a PDCCH, a PDSCH, a PSCCH, a PSSCH, a SCI, a SL-MAC-CE, or a SL-RRC message.

In some implementations, the reference signal transmission 452 includes the PA information 408. For example, the reference signal transmission 452 may indicate the PA or PAs for portions of the reference signal transmission 452, transmit chain or chains for portions of the reference signal transmission 452, and/or the PA or PAs of each transmit chain. Additionally, or alternatively, the reference signal transmission 452 may be signaled or indicated by a control channel transmission or configuration transmission (e.g., 450).

The UE 115 receives the reference signal transmission 452, including the reference signal information 406, and determines to report compression point information based on receiving the reference signal transmission 452 including the reference signal information 406. The UE 115 generates compression point information 442 based on the reference signal information 406 and/or the PA information 408. For example, the UE 115 (e.g., compression point information determiner 415 thereof) measures pilot signals or tones of the reference signal transmission 452 (e.g., reference signal information 406 thereof) to determine a transfer function for one or more PAs of the base station 105, such as one or more PAs which transmitted the reference signal transmission 452. Additional details on compression point information determination are described further with reference to FIGS. 5, 6A, 6B, and 7.

The UE 115 generates report information 444 based on the compression point information 442 and/or the PA information 408, and the UE 115 transmits the report information 444 in a report transmission 454 (e.g., a compression point information report transmission) to the base station 105. For example, the UE 115 reports compression point information 442 for one or more PAs or transmit chains of the base station 105 in the report transmission 454. The report transmission 454 may include multiple compression point information reports, and each compression point information report may correspond to a particular PA or transmit chain. The PA and/or transmit chain may be determined based on the PA information 408. To illustrate, the UE 115 may report compression point information per PA or PA group.

The UE 115 may determine a configuration or layout of the report transmission 454 based on report configuration information. Examples of report transmissions and report transmission schemes are described further with reference to FIGS. 5 and 7. The report transmission 454 may include or correspond a PUCCH, a PUSCH, a PSCCH, a PSSCH, MAC CE, or a RRC message. The report transmission 454 may be included in or indicated by layer 1, layer 2 or layer 3 signaling or multiplexed with layer 1, layer 2 or layer 3 signaling. As an illustrative, non-limiting examples, the report transmission 454 is a CSF report or a dedicated compression point information report.

In some implementations, the UE 115 also receives another transmission prior to generating the report transmission 454. For example, the UE 115 may receive a second control channel transmission indicating the transmission resources for the report transmission 454, such as an aperiodic report transmission or trigger transmission. The second control channel transmission may be indicated by layer 1, layer 2 or layer 3 signaling. To illustrate, in some such implementations, the second control channel transmission is a DCI, such as second DCI. In other such implementations, the second control channel transmission is a MAC CE or RRC transmission.

Additionally or alternatively, the second control channel transmission indicates threshold information for reporting the compression point information 442. For example, the second control channel transmission (e.g., DCI) may indicate compression point information condition information, such as threshold or range information for one or more parameters reported in the reported in the report information 444.

The base station 105 receives the report transmission 454. The base station 105, such as the power allocation manager 440 thereof, may determine a power allocation based on the report information 444 (e.g., the compression point information 442 thereof) of the report transmission 454. For example, the base station 105 may parse the report transmission 454 (e.g., the report information 444/compression point information 442 thereof) based on a report configuration indicated by the configuration transmission 450 and/or the report configuration information to determine the compression point information 442 for the PAs of the PA information 408, and generate a new power allocation, such as power allocation 462, based on the compression point information 442.

The base station 105 may then use the new power allocation 462 to send one or more transmissions 456 to the UE 115, and optionally other UEs. For example, the base station 105 may then generate a first transmission of the one or more transmissions 456 indicating the determined, new power allocation for the UE 115, such as power allocation 462, or may generate the first transmission in accordance with the determined, new power allocation for the UE 115. To illustrate, the base station 105 may transmit a DCI or MAC CE indicating PDCCH and/or PDSCH resources for the UE 115 to send one or more data transmissions to the UE 115, where at least one data transmission of the data transmissions is sent in accordance with the determined, new power allocation.

Accordingly, the network (e.g., the base station 105 and the UE 115) may be able to indicate compression point information to a transmitting device and more efficiently allocated transmit power to different transmit chains to reduce distortion. Reducing distortion may reduce transmission errors and processing latency and may increase signal strength due to increased transmit power with less distortion, which may lead to better network operations. Accordingly, the network performance and experience may be increased due to reductions in latency, errors, and power consumption.

Figure 5:
FIG. 5 is a timing diagram illustrating an example process that supports enhanced compression point information reporting according to one or more aspects.

Referring to FIG. 5, FIG. 5 is a timing diagram 500 illustrating a wireless communication system that supports enhanced channel state information reporting according to one or more aspects. The example of FIG. 5 corresponds to an example of compression point information reporting operations which may include reporting P1 dB information in a CSF report.

The example of FIG. 5 includes similar devices to the devices described in FIGS. 1, 2, and 4, such as a UE 115 a network entity (e.g., base station 105). The devices of FIG. 5 may include one or more of the components as described in FIGS. 2 and 4. In FIG. 5, these devices may utilize antennas 252a-r, transmitter 410, receiver 412, encoder 413 and/or decoder 414, or may utilize antennas 234a-t, transmitter 434, receiver 436, encoder 437 and/or decoder 438 to communicate and receive transmissions. In some implementations, network entity may include or correspond to multiple TRPs of a single base station (e.g., base station 105), to multiple base stations, or any combination thereof.

At 510, the base station 105 and the UE 115 may optionally perform one or more configuration operations (e.g., compression point information reporting configuration operations) with each other. For example, the base station 105, the UE 115, or both, communicate configuration information (e.g., compression point information reporting configuration information) to enable dynamic and/or distributed power allocation operations. As one example network configuration, the base station 105 transmits configuration information to the UE 115. To illustrate, the base station 105 may transmit a downlink transmission including configuration information, such as transmit RRC signaling (e.g., a RRC transmission or message), including the configuration information, to the UE 115.

At 515, the base station 105 transmits a reference signal to the UE 115. For example, the base station 105 may generate and transmit a control channel transmission including a reference signal (e.g., reference signal information)

and optionally including an indication to report compression point information (e.g., such as in a CSF report). To illustrate, the base station 105 may transmit a DCI including a CSI-RS. In some implementations, the reference signal is transmitted with information indicating to measure and report compression point information. In other implementations, the UE 115 is previously configured to report CSF including compression point information, such as at or 510 or prior to 515.

In some implementations, the reference signal has a high or increased peak-to-average power ratio (PAPR) as compared to legacy reference signals. For example, the reference signal may include or correspond to a modified or new version of a CSI-RS which has a higher PAPR than a current or conventional CSI-RS. In some implementations, the reference signal may be a specialized reference signal for reporting compression point information and different from other reference signals for reporting other or conventional CSF information. Currently in wireless networks, reference signals, such as CSI-RS, are often designed to have a low PAPR. Increasing PAPR may enable the receiving device to determine more accurate compression point information and/or generate the compression point information more easily (e.g., with less effort or resources).

In some such implementations, the reference signal will have or utilize a new sequence or arrangement of pilots (pilot signals or tones). Each pilot may be designed to have a dynamic range that is as high as the corresponding data or a data threshold. For example, new CSI-RS sequences with a PAPR which is greater than conventional 5G (e.g., Release 16 CSI-RS sequences) may be used to determine the transfer function information and measure compression point information.

Additionally, or alternatively, the reference signal may be unprecoded (e.g., not precoded). For example, the pilot signals or tones of the reference signal are not precoded (e.g., are not generated by or adjusted by a precoder of the base station 105). Unprecoded pilots may enable broadcasting of the pilot signals or tones and/or decoding by more devices.

In some implementations, the reference signal is a conventional reference signal which satisfies a threshold, such as a subset of conventional references signals which satisfies a condition. The reference signal generation process may involve generating one or more candidate reference signals and comparing them to each other or to a threshold. For example, the device may select a candidate reference signal of a set of candidate reference signals with a highest PAPR or a first candidate reference signal that has a PAPR which satisfies a threshold PAPR.

In some such implementations, the reference signal (e.g., CSI-RS) or candidate reference signal is generated based on conventional operations (e.g., based on a random or pseudo-random seed). To illustrate, the device may serially generate candidate reference signals and determine if the candidate reference signal satisfies the threshold. If it does not, the device may generate a new candidate reference signal. In some other implementations, the device may be programmed with or may determine a set of qualifying reference signals, and may select the reference signal from a qualified list or subset of reference signals, such as high PAPR reference signals or distributed power allocation reference signals.

At 520, the UE 115 determines a transfer function for a power amplifier (PA) associated with the reference signal, such as a PA transfer function. For example, the UE 115 retrieve transfer function information associated with one or more PAs or TX chains of the base station 105, or may calculate transfer function information for one or more PAS or TX chains of the base station 105. The UE 115 may determine the transfer function information based on receiving and processing the reference signal. For example, the UE 115 may estimate the transfer function based on received power of the reference signal and expected power (e.g., Pin) of the reference signal. To illustrate, the UE 115 may receive an indication of transmit or expected power for pilot signals or tones and determine received power of the pilot signals or tones by measurement, and then the UE 115 may generate a graph or plot of corresponding expected and measured power points. The UE 115 may determine the transfer function based on the graph or plot of points (Pout, Pin) of received power and corresponding expected power. The transfer function may correspond to an equation or function which represents a curve or line connecting the plotted points of received and expected power for the reference signal.

In some implementations, the transfer function information is generated after equalization of the reference signal. For example, the UE 115 may measure the received power and determine the expected power after equalization of the reference signal. As another example, the UE 115 may measure the reference signal and determine or estimate the received power and/or expected power, and then the UE 115 may equalize or adjusted the measurements of received power and/or indications of expected power.

At 525, the UE 115 may determine the compression point information based on the transfer function information. For example, the UE 115 may determine a point at which the transfer function changes from linear to curved or deviates from a linear correlation of received and expected power for the reference signal. Said another way, the UE 115 may determine when the transfer function changes from a linear region to a curved region (e.g., a zero dB compression point). As another example, the UE 115 may have a threshold or setting (e.g., 0.5 dB compression point, 1 dB compression point, 1.5 dB compression point, 2 dB compression point, 3 dB compression point, etc.) and determine when the transfer function satisfies the threshold or setting. To illustrate, the UE 115 may determine when the transfer function satisfies a condition where the received power is 1 dB less than the expected power, e.g., a gain where a power out is 1 dB less than a power in.

At 530, the UE 115 reports the compression point information. For example, the UE 115 may transmit the compression point information in an uplink control channel transmission, such as UCI or MAC CE in a PUCCH, or an uplink shared channel transmission, such as PUSCH. To illustrate, the UE 115 may transmit the compression point information in an existing report, e.g., a CSF report transmission, or in a dedicated compression point report transmission. The compression point information or report may indicate compression point information for one or more PAs or transmit chains of the base station 105. For example, the compression point information may indicate a first compression point for a first PA (e.g., first compression point information), a second compression point for a second PA (e.g., second compression point information), etc. As another example, the compression point information may indicate a first compression point (e.g., 25 dBm) for a first transmit chain and a second compression point (e.g., 25 dBm) for a second transmit chain. As other examples, a compression point may be indicated for groups or subsets of PAs and/or transmit chains. To illustrate, the compression point information may indicate a first compression point for a first group of transmit chains and a second compression point for a second group of PAs.

In some implementations, the compression point information indicates a P1 dB. In other implementations, the compression point information indicates a compression point associated with a different threshold amount of non-linearity, such as a 0.5 dB compression point, a 2 dB compression point, a 3 dB compression point, etc. In some such implementations, different compression points may be indicated by the compression point information, such as P1 dB for a first element and a 3 dB compression point for a second element. The compression point information type or threshold may be set by the network based on device type, transmit chain type, PA type, frequency information (e.g., band or FR), distance, current power allocation information, beam direction, interference information, operational mode information, or a combination thereof. For example, the network may set different non-linearity thresholds for different frequency bands, for devices which are further away or are using more power, network congestion, operating mode (e.g., UL/DL or SL), etc.

In some implementations, the UE 115 transmits the compression point information (or the compression point information 442) to the base station 105 in a single transmission. In other implementations, the UE 115 may transmit the compression point information 442 over multiple reports or transmissions. For example, the UE 115 may determine compression point information for multiple PAs or transmit chains in a single reference signal transmission and transmit the compression point information over multiple report transmissions, such as due to bandwidth limitations or constraints. As another example, the base station 105 may have more transmit chains, and the UE 115 may determine the compression point information for multiple transmit chains of the transmit chains over multiple reference signal transmissions. The UE 115 may then report the compression point information over multiple report transmissions.

In some implementations, prior to 530, the UE 115 may optionally receive a transmission or signal to trigger the reporting of the compression point information. For example, the UE 115 may receive a CSF report signaling transmission or triggering transmission for dynamic reporting modes. The CSF report signaling or triggering transmission may include or correspond to a DCI, MAC CE, or RRC message. Although one example of CSF reporting is illustrated in the example of FIG. 5. The compression point information may be reported in other types of report message or with other types of reporting schemes. For example, the compression point information may be reported with dynamic measuring, dynamic reporting, semi-static measuring, semi-static reporting, periodic measuring, periodic reporting, or any combination thereof.

At 535, the base station 105 determines a power allocation based on the compression point information. For example, the base station 105 receives the compression point information from the UE 115 and may determine new a power allocation rule or a new dynamic power allocation based on the compression point information for one or more devices or for one or more transmit elements. As described with reference to FIG. 4, and further with reference to FIGS. 6A and 6B, the power allocation or power allocation rule may include an uneven or unequal power allocation distribution. That is, a device may transmit with a different power allocation for each transmit chain and/or PA. As another example, different devices may receive transmissions with different power allocations from the base station 105 at one time, or a single device may receive transmissions over different receive chains with different power allocations at the same time.

At 540, the base station 105 optionally transmits a control transmission to the UE 115 responsive to the compression point information. For example, the base station 105 may generate and transmit a control channel transmission indicating a new power allocation or power allocation distribution for one or more downlink transmissions. To illustrate, the base station 105 may transmit a DCI scheduling one or more PDSCH transmission which have a new or updated power allocation. In some implementations, the control transmission indicates that the power allocation has changed generally or indicates a specific change to the power allocation (e.g., 3 more dBs). In other implementations, the control transmission just schedules an upcoming transmission which will be sent with a power allocation that was determined based on the compression point information and is different from a power allocation that was used to send a previously sent PDSCH.

At 545, the base station 105 transmits a downlink transmission to the UE 115 in accordance with the determined power allocation. For example, the base station 105 may generate and transmit a downlink transmission to the UE 115 in accordance with the power allocation determined based on the received compression point information. To illustrate, the base station 105 may transmit a PDSCH to the UE 115 with a power allocation (transmit power) that reduces non-linear distortion. The power allocation may be an equal power allocation, such as an equal power allocation with reduce power to reduce non-linear distortion, or may be an unequal or distributed power allocation which reduces non-linear distortion, as compared to one or more previous transmissions. The power allocation may reduce distortion as described further with reference to FIGS. 6A and 6B by reducing the amount of power allocation or gain into a non-linear region of a PA or transmit chain (e.g., reduce power above a compression point).

After 545, the devices may optionally perform one or more transmissions and/or one or more reporting or adjustment operations as described with reference to FIG. 4, above in FIG. 5, or with reference to FIG. 7.

Accordingly, in the example of FIG. 5, devices of the network may be able to engage in enhanced compression information reporting to enable enhanced distributed power allocations which reduce transmission distortion and improve transmission reception. Distributed power allocations enable reduced receive processing, as described further with reference to FIGS. 6A, 6B, and 7.

Although two devices are illustrated in the example of FIG. 5, in other implementations the network includes additional devices, such as additional UEs and network devices. The network device may receive compression point information for multiple UEs and may transmit downlink transmission to multiple devices using power allocations determined based on the received compression point information from multiple UEs, as described further with reference to FIG. 6.

Although uplink-downlink operations are illustrated in FIGS. 4 and 5, compression point information may be reported in sidelink operations. For example, one or both UEs may report compression point information to each other in sidelink channel reporting messages to enable enhanced power allocation. Furthermore, sidelink channel reporting of compression point information may enable dynamic and/or distributed power allocation for sidelink transmissions. Additionally, or alternatively, although the operations described herein are shown with respect to a UE reporting compression point information to the network, network devices may transmit compression point information to UEs for adjusting power allocations for uplink transmissions (uplink transmit power).

Figures 6A, 6B:
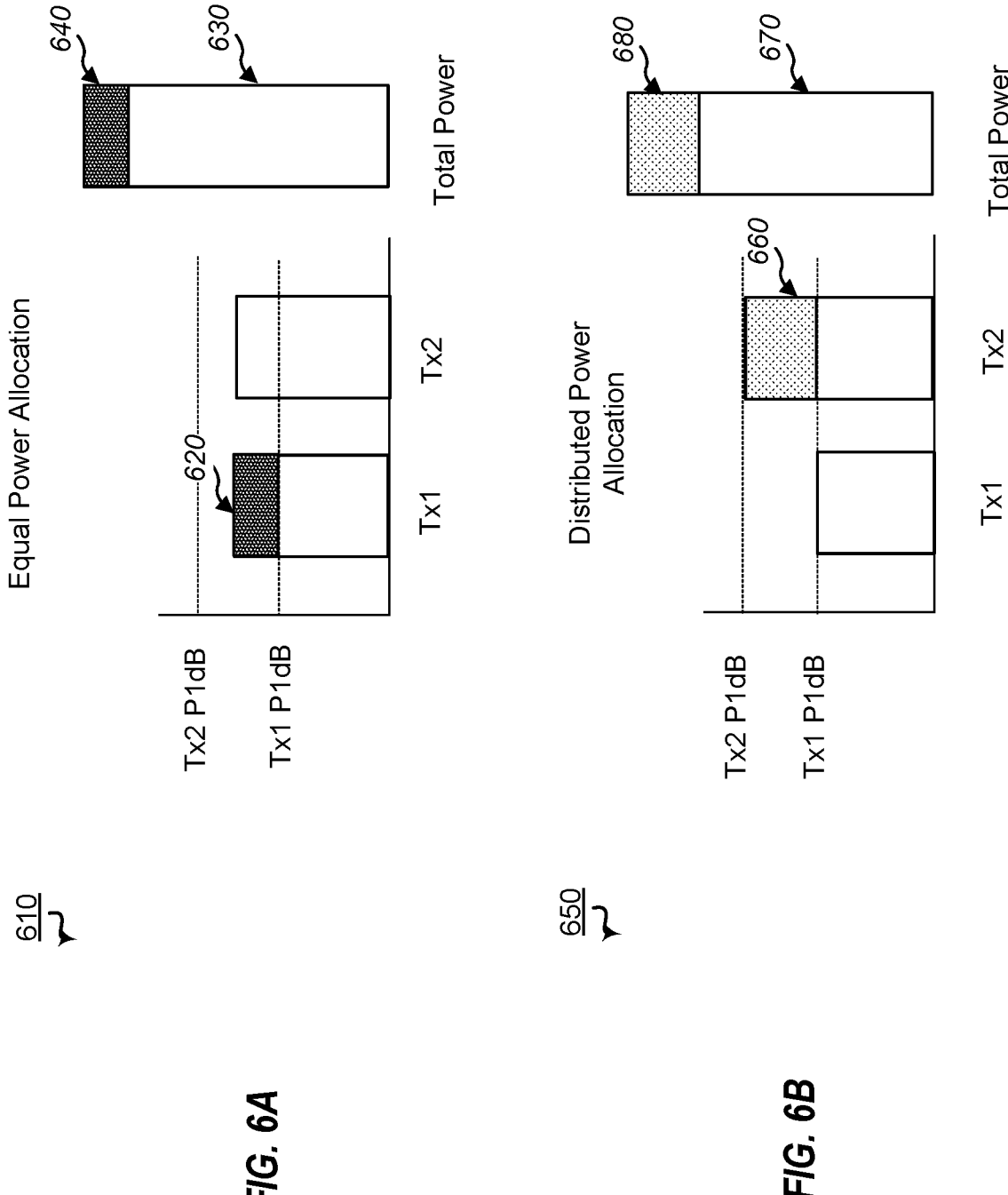
FIGS. 6A and 6B are each a power allocation diagram illustrating an example power allocation according to one or more aspects.

Referring to FIGS. 6A and 6B, FIGS. 6A and 6B each illustrate an example of a power allocation with graphs depicting individual power allocations and total power allocations. Two different types of power allocations are illustrated in FIGS. 6A and 6B, an equal power allocation 610 is illustrated in FIG. 6A and a distributed power allocation 650 is illustrated in FIG. 6B.

In the example of FIG. 6A, the equal power allocation 610 has an equal or even power allocation for each transmit chain (e.g., PA thereof) of the transmitting device (e.g., UE or BS). The equal power allocation 610 may not be generated based on compression point information. For example, the equal power allocation 610 may be a default or legacy power allocation and may not utilize compression point information to take advantage of differences in PAs and/or reduce non-linear distortion.

As illustrated in FIG. 6A, the first transmit chain (Tx1) has a lower P1 dB compression point than the second transmit chain (Tx2). To illustrate, the first transmit chain (Tx1) experiences non-linearity earlier than the second transmit chain (Tx2) and may experience more non-linearity and distortion for a given power allocation (transmit power).

In the example operation of the equal power allocation 610 of FIG. 6A, the transmitting device transmits with the same transmit power across the first and second transmit chains. The transmit power of the equal power allocation 610 is above the first compression point (Tx1 P1 dB) of the first transmit chain (Tx1) and below the second compression point (Tx2 P1 dB) of the second transmit chain (Tx2). The transmission on the first transmit chain (Tx1) experiences more non-linearity (more non-linear distortion) than that transmission on the second transmit chain (Tx2). As illustrated in FIG. 6A, the first transmit chain (Tx1) has additional transmit power above the first compression point (Tx1 P1 dB) which generates distortion and is referred to as a distortion portion 620. The second transmit chain (Tx2) does not have transmit power above the second compression point (Tx2 P1 dB) and does not generate distortion (e.g., non-linear distortion) or generates distortion (e.g., non-linear distortion) underneath a threshold (e.g., P1 dB).

FIG. 6A also illustrates a total power 630 (total transmit power) used for the transmissions on the first and second transmit chains. The total power represented a sum of the individual transmit powers on the first and second chains. In FIG. 6, the total power also illustrates an amount of distortion generated by the first and second transmit chains, e.g., the total amount of distortion. As depicted in FIG. 6A, the total power 630 includes a portion (distortion portion 640) of the total power 630 which corresponds to non-linear distortion, such as excess transmit power over the compression point that caused distortion. In the example of FIG. 6A, the distortion portion 640 of the total power 630 comes from the distortion portion 620 generated by the first transmit chain (Tx1) and the equal power allocation 610 (equal power distribution).

Accordingly, a receiving device (e.g., a receiver thereof) may experience errors from the distortion on the first transmit chain or may have to utilize additional distortion processing (e.g., DPD or DPOD) to process the transmission. The additional distortion processing increases processing time and latency and power consumption. In addition, if the transmitting device attempts to reduce the transmit power equally to reduce distortion on the first transmit chain, the receiving device or receive chain corresponding to the second transmit chain may not be able to receive the second transmission due to not having enough transmit power. As another example, transmit chains may have different linearity, such as due to manufacturing differences, and/or develop additional or different linearity over time and/or at different operating conditions (e.g., temperature), and the transmitting device may be unaware of such non-linear distortion with compression point information reporting from a receiving device.

Referring to FIG. 6B, in the example of FIG. 6B the distributed power allocation 650 has an unequal or uneven power allocation for one or more transmit chains (e.g., PA thereof) of the transmitting device (e.g., UE or BS). The distributed power allocation 650 may be generated based on compression point information. As illustrated in FIG. 6 and described above, the first transmit chain (Tx1) has a lower P1 dB compression point than the second transmit chain (Tx2).

In the example operation of the distributed power allocation 650 of FIG. 6B, the transmitting device transmits with the different transmit powers across the first and second transmit chains to better match the power allocation/transmit power to the linearity region or capability of the transmit chain. For example, the transmitting device transmits with a first power allocation (transmit power) on the first transmit chain (Tx1) which is at or near the first compression point (P1 dB Tx1) of the first transmit chain (Tx1) and transmits with a second power allocation (transmit power) on the second transmit chain (Tx2) which is at or near below the second compression point (P1 dB Tx2) of the second transmit chain (Tx2). The transmission on the first transmit chain (Tx1) experiences similar non-linearity as compared to the transmission on the second transmit chain (Tx2) for the distributed power allocation 650 of FIG. 6B, and transmission on the first transmit chain (Tx1) experiences less non-linearity as compared to the transmission on the first transmit chain (Tx1) for the equal power allocation 610 of FIG. 6A.

In some implementations, each transmission may experience no or negligible non-linearity (distortion caused by a non-linear region of the PA or transmit chain) for the distributed power allocation 650 of FIG. 6B.

FIG. 6B also illustrates a total power 670 used for the transmissions on the first and second transmit chains, and a corresponding portion 680 of the total power 670 which corresponds to additional power for the second transmit chain which has been amplified in a linear region or such that it satisfies a linearity thresholds (e.g., P1 dB). Accordingly, the distributed power allocation 650 of FIG. 6B enables a transmitting device to account for differences or variations in non-linearity between its transmit chains and enables the transmitting device to transmit with reduced distortion, such as no non-linear distortion or with non-linear distortion below a threshold. The reduced distortion transmission may enable reduced receive processing by a receiving device.

Figure 7:
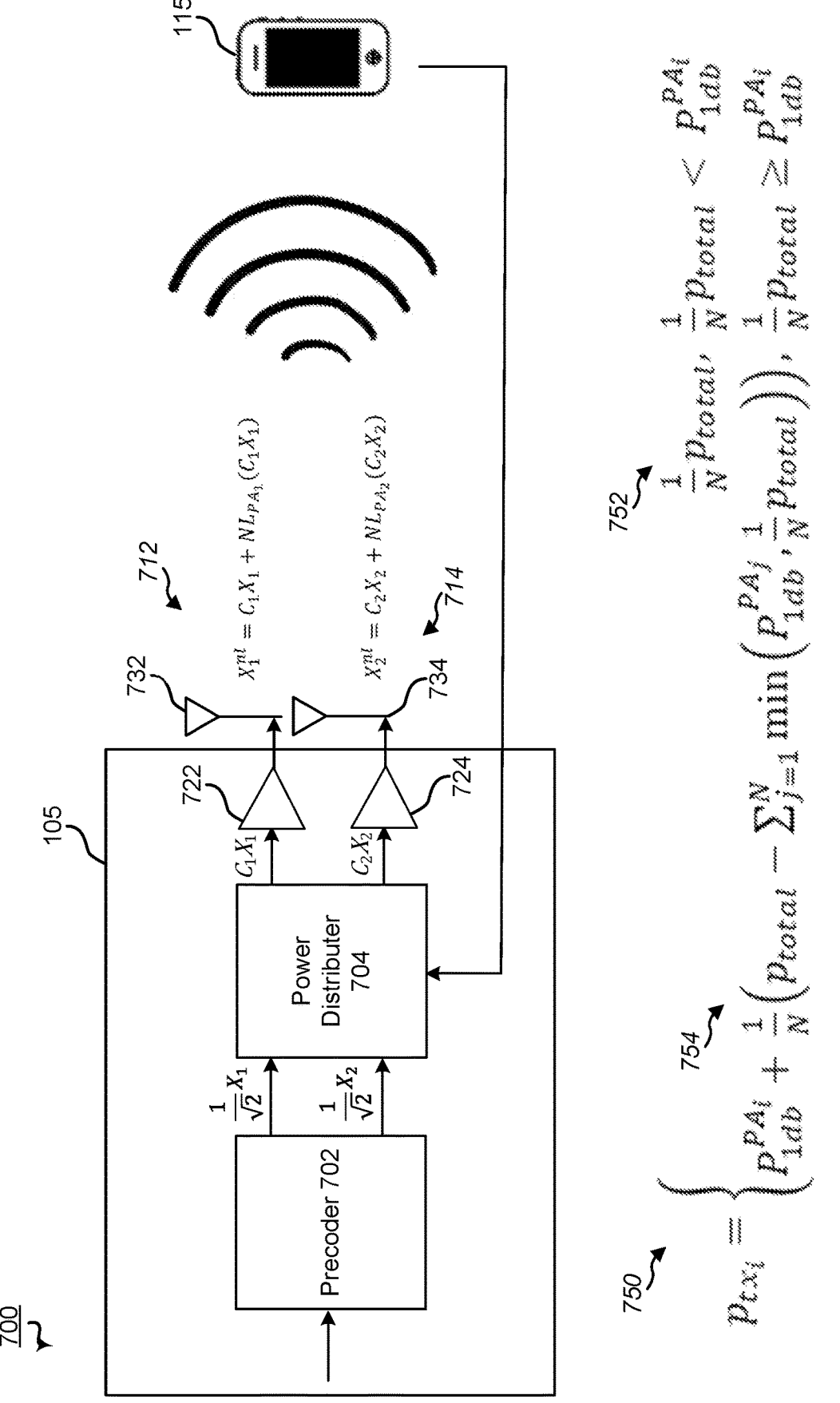
FIG. 7 is a block diagram illustrating an example of power allocation operations for enhanced compression point information reporting according to one or more aspects.

Referring to FIG. 7, FIG. 7 illustrates a block diagram 700 of an example configuration of a transmitting device for enchanted compression point information reporting and power allocation operations. In the example, of FIG. 7, the transmitting device comprises a base station, such as base station 105, and includes a precoder 702, a power distributor 704, and a plurality of transmit chains 706. The precoder 702 includes or correspond to precoder 302 of FIG. 3A. The power distributor 704 includes or corresponds to power allocation manager 440 of FIG. 4 and may include power distribution (power allocation) rules and/or logic. The plurality of transmit chains 706 include or correspond to the transmit chains of FIG. 3A and the PAs and antennas thereof may include or correspond to the PAs and antennas of FIG. 3A.

In the example of FIG. 7, each transmit chain of the plurality of transmit chains 706 includes a corresponding amplifier and antenna. To illustrate, the base station 105 includes the first transmit chain 712 that includes a first PA 722 and a first antenna 732 and the second transmit chain 714 that includes a second PA 724 and a second antenna 734.

Although two transmit chains are illustrated for simplicity, in other implementations the transmitting device may have additional transmit chains, such as 4, 8, 64, etc. Additionally, the transmit chains have been simplified in FIG. 7. The transmit chains may have additional components not shown in FIG. 7, such as matching circuitry, switches, filters, etc.

During operation, the UE 115 transmits compression information, such as in a compression information report to the base station 105. For example, the UE 115 may receive a reference signal (not shown in FIG. 7) from the base station 105 and determine compression point information based on the reference signal as described with reference to FIGS. 4 and 5. To illustrate, the base station 105 may transmit the reference signal (e.g., CSI-RS with high PAPR) with both the first and second transmit chains 712 and 714.

Each transmit chain may transmit its own version or instance of the reference signal (e.g., same reference signal) or each transmit chain may transmit a different or dedicated reference signal. The UE 115 receives the reference signal or signals and determines the compression point information. For example, the UE 115 may receive the reference signals from the first and second transmit chains 712 and 714 with its own corresponding receive chains (e.g., first and second receive chains). To illustrate a first receive chain of the UE 115 receives the first reference signal from the first transmit chain 712 and a second receive chain of the UE 115 receives the second reference signal from the second transmit chain 714.

Additionally, in some implementations, the transmitting device may have more transmit chains than a receive device has receive chains. In some such implementations, the receiving device (e.g., compression point information reporting device) may measure or report the compression point information for all of the transmit chains over multiple reference signal transmission instances (e.g., over multiple slots, subframes, etc.) and/or may report the compression point information over multiple reports. To illustrate, the UE 115 may utilize a first receive chain to measure both the first and second transmit chains 712, such as measures the first transmit chain 712 at a first time and the second transmit chain 714 at a second time. Alternatively, in other implementations, the receiving device (e.g., compression point information reporting device) may measure a subset of transmit chains of the transmitting device and only reports compression point information for one or more of the measured transmit chains, such as based on or subject to receive chain limitations.

After receiving the compression point information, the base station 105 transmits a new transmission or transmissions based on or in accordance with the compression point information. For example, as illustrated in FIG. 7, the power distributor 704 determines a new power allocation rule or power distribution for transmissions from the base station 105. The new power allocation may be different from the power allocation of FIG. 3A and account for the respective differences between the transmit chains, and specifically for the non-linearity differences of each PA of the transmit chains. The base station 105 then generates and transmits a downlink transmission or transmissions to the UE 115 using the new power allocation. For example, the precoder 702 may receive information for precoding and generate a plurality of precoded outputs for transmission via a corresponding transmit chain. As illustrated in the example of FIG. 7, the precoder 702 generates first precoded information for transmission via the first transmit chain 712 and second precoded information for transmission via the second transmit chain 714. The precoded information may be provided to the power distributor 704. The power distributor 704 adjusts the power amplification for each transmit chain 712, 714. To illustrate, the power distributor 704 may adjust the power of each received precoded information.

Alternatively, the power distributor 704 controls the PAs 722, 724 of the transmit chains 712, 714 and the precoder 702 provides the first and second precoded information to the respective PAs 722, 724, which amplify the precoded information according to the power distribution rule, which was determined based on the compression point information. Each precoded information (or signals derived from them) may receive a different amount of power amplification from the respective PA of the PAs 722, 724 and may be transmitted with a different transmit power via its respective antenna and transmit chain. To illustrate, the first PA 722 may amplify the first precoded information to a higher degree (with a higher gain) than the second PA 724 and to generate amplified first precoded information. The amplified first precoded information is provided to the first antenna 732 and transmitted by the first antenna 732 and first transmit chain 712. The second PA 724 may amplify the second precoded information to a lesser degree (with a lower gain) than the first PA 722 and to generate amplified second precoded information. The amplified second precoded information is provided to the second antenna 734 and transmitted by the second antenna 734 and second transmit chain 714. The difference in amplification between the PAs and between the overall transmit power of the transmit chains may be due to the second PA 724 having a lower 1 dB compression point than the first PA 722 (e.g., experience non-linear distortion at lower gains or more non-linear distortion per transmit power). The base station 105 can then take advantage of the higher amplification power of the first PA 722 and first transmit chain 712 to transmit transmission to the UE 115, and optionally one or more other UEs.

The UE 115 receives one or more of the transmissions from the transmit chains of the base station 105 in accordance with the power allocation determined based on the UE's compression point information. The UE 115 receives the transmission or transmission with reduced distortion and may be able to receive the transmission or transmissions with less errors and/or with reduced processing effects. For example, the UE 115 may be able to refrain from DPD (digital pre-distortion) processing and/or DPOD (digital post-distortion) processing of the received transmissions. By not engaging in additional distortion processing, the UE 115 may reduce latency and power consumption.

In some implementations, the precoder may not be used for transmission of the reference signal (not shown in FIG. 7) as described with reference to FIGS. 4 and 5. For example, the precoder may be used for beamformed transmissions to a specific device or group of devices, and some reference signals may be broadcast in all directions, that is not beamformed. Although the transmitting device of the example of FIG. 7 corresponds to a base station, in other implementations the transmitting device is a UE or other network device (e.g., AP).

Additionally, as described above, real world implementations may involve many more devices. When multiple UEs or compression point information reporting devices are providing compression point information to the transmitting device, the transmitting device may generate a specific power allocation for each reporting device or may generate a power allocation for one or more devices based on compression point information from one or more of the reporting devices. For example, the transmitting device may take into account compression point information for all reporting devices or a subset of reporting (e.g., all similar devices, all devices in a same location or distance, received within a similar period of time, etc.) or may take into account compression point information from only the device in which the transmission is intended.

To illustrate an example of the dedicated compression point information scenario, if two devices are receiving transmissions from the base station 105 (e.g., a first UE receiving a first TX from first transmit chain 712 and second UE receiving a second TX from second transmit chain 714) the base station 105 uses first compression point information from the first UE (e.g., for the first transmit chain) for transmissions to the first UE from the first transmit chain and uses second compression point information from the second UE (e.g., for the second transmit chain) for transmissions to the second UE from the second transmit chain.

To illustrate an example of the using compression point information from multiple devices, the base station 105 uses at least a portion of first compression point information from the first UE (e.g., for the first transmit chain and/or the second transmit) and uses at least a portion of second compression point information from the second UE (e.g., for the first and/or second transmit chain) for transmissions to the first UE and/or the second UE from the first and/or second transmit chain.

In FIG. 7, an example equation is given for non-linearity for distributed power distribution operations. Data (e.g., unprecoded data) Sj is provided to the precoder 702. The precoder 702 operates with equal power and generates two outputs, one for each antenna or layer, and the total power for each output is the same, Xi divided by the square root of two. The power distributer 704 may allocate power to each of the two outputs from the precoder 702 differently. For example, each output may be multiplied by a different value, Ci.

The respective power amplifiers each add non-linearity and distortion to their respective signals based on the input signal and the PAs transfer function. The non-linearity of the resulting signal (not accounting for gain) is given by the equation in FIG. 7, where the non-linearity of the signal after power amplification is the original non-linearity after power distribution plus a sum of the non-linearity after power distribution multiplied by the non-linearity of the power amplifier ($NL_{PA}$). The example of FIG. 7 corresponds to a single layer example for two transmitting antennas.

As an illustrative example, a power distribution allocation rule 750 is illustrated in FIG. 7. The power distribution allocation rule 750 may allocate a first transmit power 752 to every transmitter (e.g., PA) which has a P1 dB value which is greater than a value of a total transmit power (Ptotal) divided by the number of transmitters (n), that is a value of Ptotal/n. The first transmit power 752 may have a value of the total transmit power divided by the number of transmitters, such as Ptotal/n. This first transmit power 752 value may be similar to transmit power in equal power distribution, and enables devices with higher compression points to receive or be allocated full power. In other implementations, the first transmit power 752 for each transmitter or PA with a P1 dB value greater than a value of the equal power distribution value is the P1 dB value for the transmitter or PA. In such implementations, each PA may have increased power as compared to the equal power allocation but still not add more than 1 dB of non-linear distortion. Alternatively, the first transmit power 752 value may be determined similar to the second transmit power 754 value below and may use one or more functions to assign relatively more power to transmitters/PAs with higher P1 dB values using a minimum value function or a maximum value function.

Additionally, the power allocation rule may allocate a second transmit power 754 (or second transmit powers) for every transmitter which has a P1 dB value less than or equal to the value of total transmit power divided by the number of transmitters. The second transmit power 754 may be equal to a sum of the P1 dB value for a specific transmitter plus a second value which is a difference of the total transmit power (Ptotal) and a summation of values of a lower of the P1 dB value or the equally divided total power (Ptotal/n) for every transmitter and divided by the number of transmitters. In such implementations, the transmitters may still have more than 1 dB of non-linear distortion, but the non-linear distortion is reduced from the equal power allocation. In other implementations, the second transmit power 754 for each such qualifying transmitter is the P1 dB value for the particular transmitter, which results in no more than 1 dB of non-linear distortion.

Figure 10:
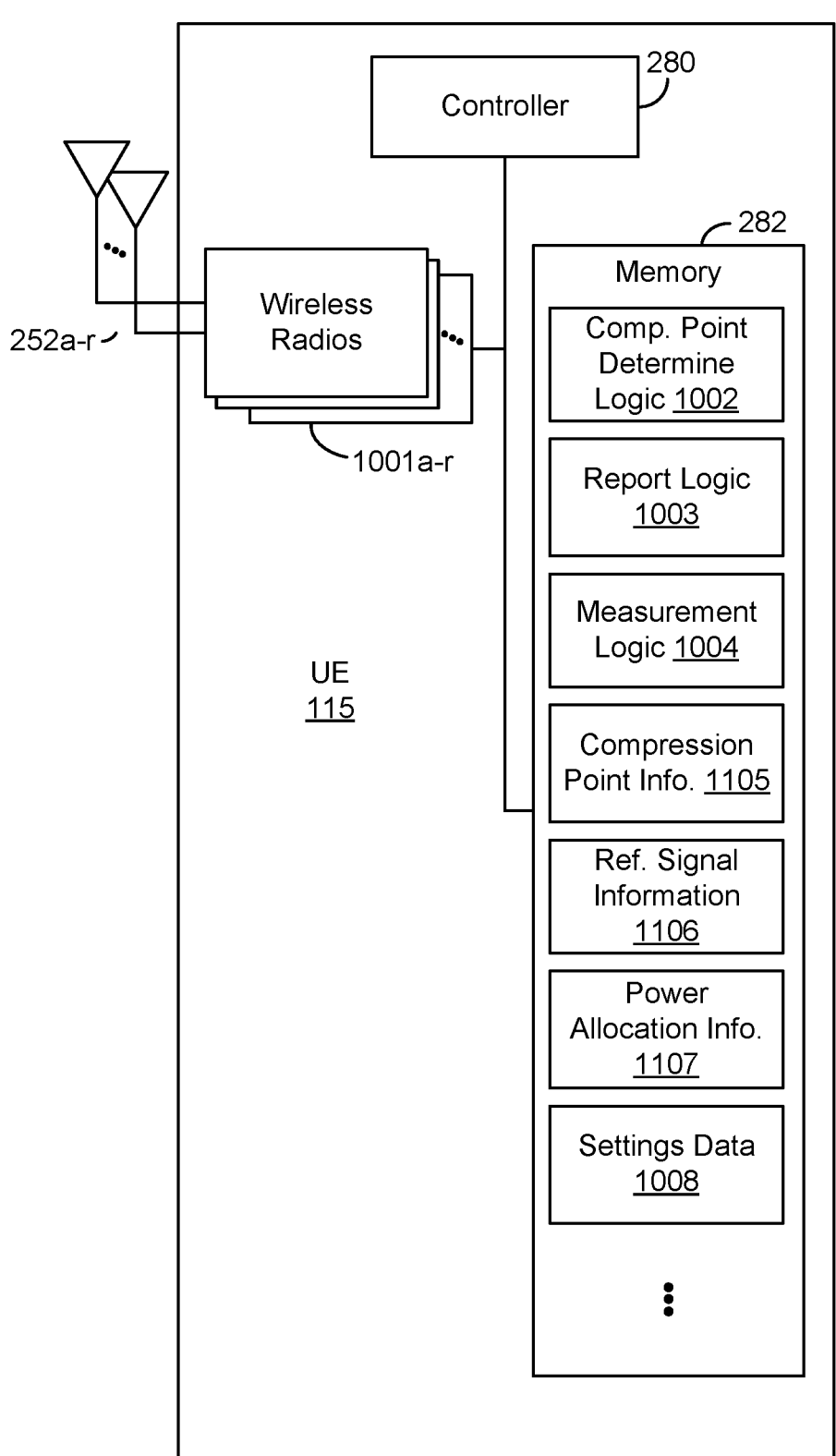
FIG. 10 is a block diagram of an example UE that supports enhanced compression point information reporting according to one or more aspects.

FIG. 8 is a flow diagram 800 illustrating example blocks executed by a wireless communication device (e.g., a UE or base station) configured according to an aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1001a-r and antennas 252a-r. Wireless radios 1001a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 10, memory 282 stores one or more of compression point information determination logic 1002, report logic 1003, measurement logic 1004, compression point information 1005, reference signal information 1006, power allocation information 1007, or settings data 1008. The data (1002-1008) stored in the memory 282 may include or correspond to data and/or logic to enable the operations of FIGS. 4-6.

At block 802, a wireless communication device, such as a UE or a base station, receives, from a second network node, a reference signal. The reference signal may include or correspond to one or more of the reference signal transmission 452 of FIG. 4 or the reference signal 515 of FIG. 5. For example, the UE 115 receives the reference signal transmission 452 from the base station 105.

At block 804, the wireless communication device transmits compression point information responsive to the reference signal, and the compression point information is determined based on the reference signal. The compression point information may include or correspond to compression point information 442 of FIG. 4 or the P1 dB report at 535 of FIG. 5. For example, the UE 115 transmits the report transmission 454 (e.g., a compression point information report) including the compression point information 442 to the base station 105.

At block 806, the wireless communication device receives a transmission responsive to the compression point information and in accordance with a power allocation based on the transmission of the compression point information. The transmission may include or correspond to the transmission 456 of FIG. 4 or the downlink transmission at 545 of FIG. 5. The power allocation may include or correspond to a power allocation as in any of FIG. 3A, 4, 5, 6A, 6B, or 7. For example, the UE 115 may receive the transmission 456, which was transmitted with an unequal or distributed power allocation as in FIG. 6B that was based on the compression point information 442 in the report transmission 454.

The wireless communication device (e.g., UE or base station) may execute additional blocks (or the wireless communication device may be configured further perform additional operations) in other implementations. For example, the wireless communication device may perform one or more operations described above, such as described with reference to FIGS. 3-6. As another example, the wireless communication device may perform one or more aspects as presented below.

In a first aspect, the compression point information comprises 1 decibel compression point (P1 dB) information, and wherein the P1 dB information corresponds to an output power level at which a gain decreases 1 dB from its input power level for a power amplifier of the second network node.

In a second aspect, alone or in combination with the first aspect, the power allocation comprises an unequal power distribution having different transmit power allocations for different transmitters of the second network node.

In a fourth aspect, alone or in combination with one or more of the above aspects, the reference signal comprises a channel state information reference signal (CSI-RS).

In a fifth aspect, alone or in combination with one or more of the above aspects, the CSI-RS comprises a 1 decibel compression point (P1 dB) CSI-RS, and wherein the P1 dB CSI-RS has a different (e.g., higher) PAPR than a conventional CSI-RS used for CSI determination.

In a sixth aspect, alone or in combination with one or more of the above aspects, pilot signals of the reference signal are not precoded.

In a seventh aspect, alone or in combination with one or more of the above aspects, each pilot signal of a plurality pilot signals of the reference signal corresponds to a different transmitter antenna of the second network node.

In an eighth aspect, alone or in combination with one or more of the above aspects, the at least one processor is further configured to cause the device to: determine the compression point information based on the reference signal, wherein the compression point information includes multiple compression point values (e.g., P1 dB values), and wherein each compression point value of the multiple compression point values corresponds to a particular transmit chain of a plurality of transmit chains of the second network node.

In a ninth aspect, alone or in combination with one or more of the above aspects, to determine the compression point information based on the reference signal, the at least one processor is further configured to cause the device to: determine (e.g., estimate), for each transmitter of the first network node, the compression point information based on a subset of pilot tones of a CSI-RS.

In a tenth aspect, alone or in combination with one or more of the above aspects, to determine the compression point information based on the reference signal, the at least one processor is further configured to cause the device to: determine (e.g., estimate), for each power amplifier of the first network node, compression point information based on a subset of pilot tones of a CSI-RS.

In an eleventh aspect, alone or in combination with one or more of the above aspects, to determine the compression point information based on the reference signal, the at least one processor is further configured to cause the device to: determine a received power (Pout) for each pilot signal of a CSI-RS and a corresponding expected power (Pin) of each pilot signal; determine, for one or more transmit chains of the plurality of transmit chains, a transfer function based on the received powers and the corresponding expected powers; determine a 1 decibel compression point (P1 dB) point for the one or more transmit chains based on a corresponding transfer function of the transfer functions.

In a twelfth aspect, alone or in combination with one or more of the above aspects, to determine the transfer function, the at least one processor is further configured to cause the device to: interpolate the transfer function (e.g., an equation, a curve, or set of points) based on the received power (Pout) of each pilot signal and the corresponding expected power (Pin) (e.g., pairs of receive/measure and expected powers representing points on a graph).

In a thirteenth aspect, alone or in combination with one or more of the above aspects, to determine the P1 dB information based on the CSI-RS, the at least one processor is further configured to cause the device to: equalize the received power of each pilot signal prior to the determination of the transfer function, wherein the transfer function is determined based on the equalized measured power and the expected power.

In a fourteenth aspect, alone or in combination with one or more of the above aspects, to determine the transfer function, the at least one processor is further configured to cause the device to: generate a plot of points based on the received powers and the corresponding expected powers; determine a polynomial for the plot of points using a smooth transfer function, wherein the P1 dB point is determined based on the polynomial.

In a fifteenth aspect, alone or in combination with one or more of the above aspects, to transmit the compression point information the at least one processor is configured to cause the device to: transmit a channel state feedback report including the compression point information.

In a sixteenth aspect, alone or in combination with one or more of the above aspects, to transmit the compression point information the at least one processor is configured to cause the device to: transmit a plurality of compression point values, where each compression point value of the plurality of compression point values corresponds to a different transmitter of the second network node.

In a seventeenth aspect, alone or in combination with one or more of the above aspects, the at least one processor is configured to cause the device to: receive, from the second network node, a second reference signal; transmit second compression point information responsive to the second reference signal, wherein the second compression point information is determined based on the second reference signal; and receive a second transmission responsive to the second compression point information and in accordance with a second power allocation based on the transmission of the second compression point information.

In an eighteenth aspect, alone or in combination with one or more of the above aspects, a first total power of the power allocation is the same as a second total power of the second power allocation.

In an additional aspect, the wireless communication device comprises at least one processor; and a memory coupled to the at least one processor, wherein the at least one processor is configured to cause the wireless communication device to receive a transmission in accordance with an unequal power distribution rule, wherein a power distribution of at least one transmitter of the first network node is different from a power allocation of at least one other transmitter of the first network node.

In an additional aspect, the wireless communication device comprises at least one processor; and a memory coupled to the at least one processor, wherein the at least one processor is configured to cause the wireless communication device to: receive a first transmission in accordance with a first power distribution; and receive a second transmission in accordance with a second power distribution rule, wherein the second power distribution is different from the first power distribution.

Accordingly, wireless communication devices may perform power allocation operations based on compression point information to more efficiently allocate transmit power to different transmit chains to reduce distortion. Reducing distortion may reduce transmission errors and processing latency and may increase signal strength due to increased transmit power with less distortion, which may lead to better network operations. Accordingly, the network performance and experience may be increased due to reductions in latency, errors, and power consumption.

Figure 11:
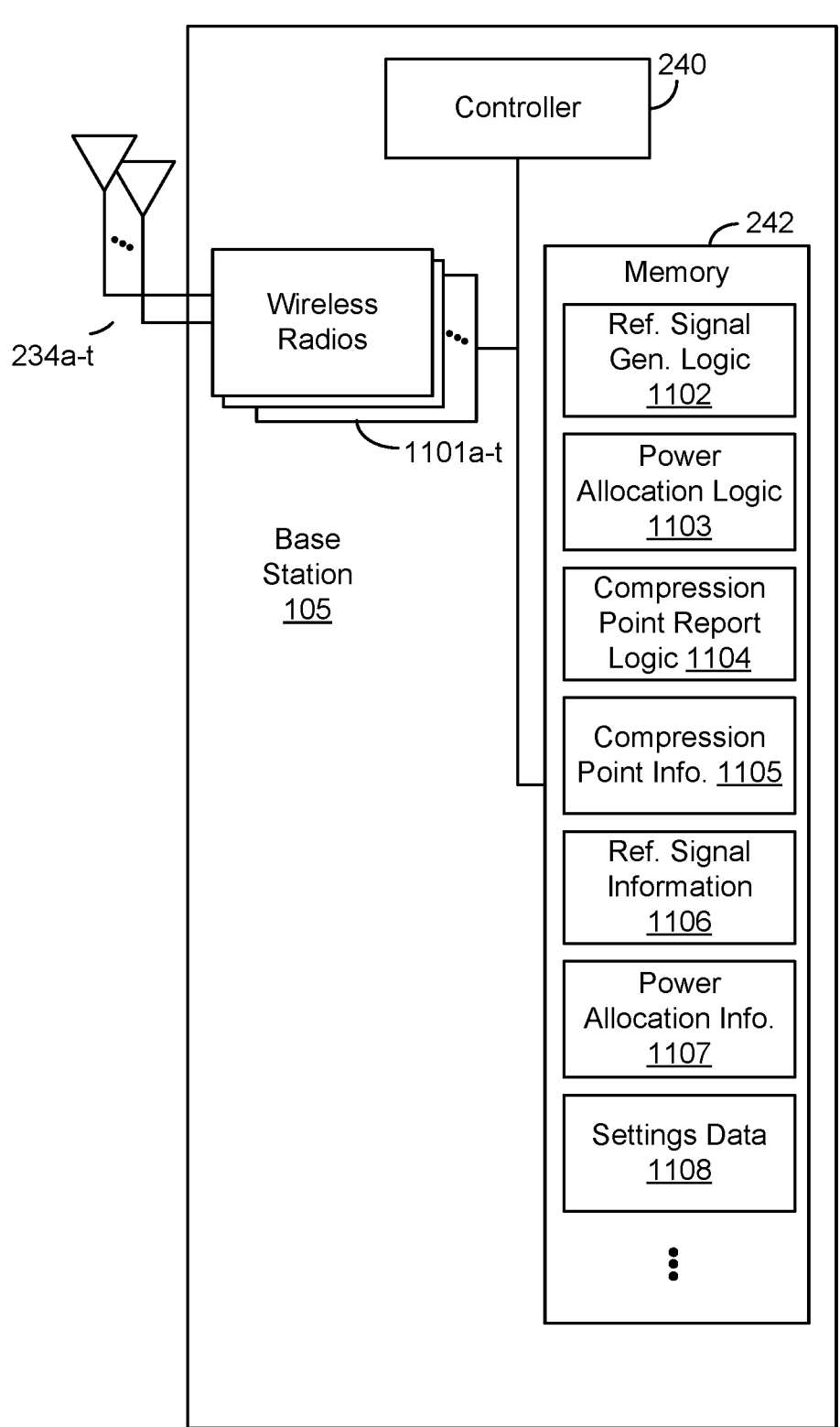
FIG. 11 is a block diagram of an example base station that supports enhanced compression point information reporting according to one or more aspects.

FIG. 9 is a flow diagram 900 illustrating example blocks executed wireless communication device (e.g., a UE or network entity, such as a base station) configured according to an aspect of the present disclosure. The example blocks will also be described with respect to base station 105 as illustrated in FIG. 11. FIG. 11 is a block diagram illustrating base station 105 configured according to one aspect of the present disclosure. Base station 105 includes the structure, hardware, and components as illustrated for base station 105 of any of FIGS. 3-6. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1101a-t and antennas 234a-t. Wireless radios 1101a-t includes various components and hardware, as illustrated in FIG. 2 for base station 105, including modulator/demodulators 232a-t, MIMO detector 236, receive processor 238, transmit processor 220, and TX MIMO processor 230. As illustrated in the example of FIG. 11, memory 242 stores one or more of compression point information determination logic 1102, report logic 1103, measurement logic 1104, compression point information 1105, reference signal information 1106, power allocation information 1107, or settings data 1108. The data (1102-1108) stored in the memory 242 may include or correspond to data and/or logic to enable the operations of FIGS. 4-6.

At block 902, a wireless communication device, such as a UE or a network device (e.g., a base station 105), transmits a reference signal. The reference signal may include or correspond to one or more of the reference signal transmission 452 of FIG. 4 or the reference signal 515 of FIG. 5. For example, the base station 105 transmits the reference signal transmission 452 to the UE 115.

At block 904, the wireless communication device receives compression point information responsive to the reference signal, and the compression point information is determined based on the transmission of the reference signal. The compression point information may include or correspond to compression point information 442 of FIG. 4 or the P1 dB report at 535 of FIG. 5. For example, the base station 105 receives the compression point information 442 from the UE 115 in the report transmission 454 (e.g., a compression point information report).

At block 906, the wireless communication device transmits a transmission responsive to the compression point information and in accordance with a power allocation determined based on the compression point information. The transmission may include or correspond to the transmission 456 of FIG. 4 or the downlink transmission at 545 of FIG. 5. The power allocation may include or correspond to a power allocation as in any of FIG. 3A. 4, 5, 6A, 6B, or 7. For example, the base station 105 may transmit the transmission 456 using an unequal or distributed power allocation as in FIG. 6B that was based on the compression point information 442 in the report transmission 454.

The wireless communication device (e.g., such as a UE or base station) may execute additional blocks (or the wireless communication device may be configured further perform additional operations) in other implementations. For example, the wireless communication device may perform one or more operations as described with reference to FIGS. 3-6. As another example, the wireless communication device may perform one or more aspects as described above with reference to FIGS. 7 and 9 or one or more aspects as presented below.

In a first aspect, the reference signal comprises a plurality of unprecoded pilot tones.

In a second aspect, alone or in combination with the first aspect, the reference signal comprises a channel state information reference signal (CSI-RS).

In a third aspect, alone or in combination with one or more of the above aspects, the CSI-RS comprises a P1 dB CSI-RS, and the at least one processor is configured to cause the device to: modify a conventional (e.g., low PAPR) CSI-RS signal to generate the P1 dB CSI-RS; select the a P1 dB CSI-RS from a pool of P1 dB CSI-RS or; generate a candidate CSI-RS and select the candidate CSI-RS as the P1 dB CSI-RS based on whether the candidate CSI-RS satisfies a PAPR condition. For example, the candidate CSI-RS may be generated based on a seed value using an equation or lookup table.

In a fourth aspect, alone or in combination with one or more of the above aspects, the at least one processor is configured to cause the device to: transmit a second reference signal to a third network node; receive, from the third network node, second compression point information responsive to the second reference signal, wherein the second compression point information is determined based on the second reference signal; and transmit, to the third network node, a second transmission responsive to the second compression point information and in accordance with a second power allocation determined based on the second compression point information, wherein the second power allocation is different from the power allocation.

In a fifth aspect, alone or in combination with one or more of the above aspects, a first total power of the power allocation is the same as a second total power of the second power allocation.

In a sixth aspect, alone or in combination with one or more of the above aspects, the power allocation distributes a total transmit power unequally between the transmitter antennas of the first network node.

In a seventh aspect, alone or in combination with one or more of the above aspects, the at least one processor is configured to cause the device to: determine the power allocation based on the compression point information, wherein the power allocation allocates transmission power to each transmitter power amplifier of the first network node based on a corresponding linear region of each transmitter power amplifier.

In an eighth aspect, alone or in combination with one or more of the above aspects, to determine the power allocation the at least one processor is configured to cause the device to: distribute transmission power from a total amount of allocated transmission power to linear regions of all the transmitter power amplifiers based on the compression point information; determine a residual amount of unallocated transmission power based on the distributed transmission power for the linear regions of all the transmitter power amplifiers and based on the total amount of allocated transmission power; and distribute the residual amount of unallocated transmission power to one or more of the transmitter power amplifiers.

In a ninth aspect, alone or in combination with one or more of the above aspects, to distribute residual amount of unallocated transmission power to the transmitter power amplifiers the at least one processor is configured to cause the device to: distribute the residual amount of unallocated transmission power to the transmitter power amplifiers equally.

In a tenth aspect, alone or in combination with one or more of the above aspects, to distribute residual amount of unallocated transmission power to the transmitter power amplifiers the at least one processor is configured to cause the device to: distribute the residual amount of unallocated transmission power to the transmitter power amplifiers on a pro rata basis (e.g., based on the relative transmit powers of each Tx PA).

In an eleventh aspect, alone or in combination with one or more of the above aspects, the at least one processor is configured to cause the device to: determine the power distribution based on a vector set $\{C_i\}_{i=1}^{N_{Tx}}$ which satisfies a condition of $\Sigma_{i=1}^{N_{Tx}} [|C]_i|^2 = 1$, wherein C is the signal amplitude after power allocation and before power amplification of the transmit chain, C is the signal power after power allocation and before power amplification of the transmit chain, $N_{Tx}$ is the number of transmit antennas, i is the index of the transmit chain.

In an additional aspect, the wireless communication device comprises at least one processor; and a memory coupled to the at least one processor, wherein the at least one processor is configured to cause the wireless communication device to transmit a transmission in accordance with an unequal power distribution rule, wherein a power distribution of at least one transmitter of the first network node is different from a power allocation of at least one other transmitter of the first network node.

In an additional aspect, the wireless communication device comprises at least one processor; and a memory coupled to the at least one processor, wherein the at least one processor is configured to cause the wireless communication device to: transmit a first transmission in accordance with a first power distribution; and transmit a second transmission in accordance with a second power distribution rule, wherein the second power distribution is different from the first power distribution, and wherein for the second power distribution transmitters of the first network node have unequal power allocations.

Accordingly, wireless communication devices may perform power allocation operations based on compression point information to more efficiently allocate transmit power to different transmit chains to reduce distortion. Reducing distortion may reduce transmission errors and processing latency and may increase signal strength due to increased transmit power with less distortion, which may lead to better network operations. Accordingly, the network performance and experience may be increased due to reductions in latency, errors, and power consumption.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A first network node for wireless communication, comprising:

at least one processor; and a memory coupled to the at least one processor, wherein the at least one processor is configured to:

receive, from a second network node, a reference signal;

transmit compression point information responsive to the reference signal, wherein the compression point information is determined based on the reference signal; and receive a transmission responsive to the compression point information and in accordance with a power allocation based on the transmission of the compression point information.

2. The first network node of claim 1, wherein the compression point information comprises 1 decibel compression point (P1 dB) information, and wherein the P1 dB information corresponds to an output power level at which a gain decreases 1 dB from its input power level for a power amplifier of the second network node.

3. The first network node of claim 1, wherein the power allocation comprises an unequal power distribution having different transmit power allocations for different transmitters of the second network node.

4. The first network node of claim 1, wherein the reference signal comprises a channel state information reference signal (CSI-RS).

5. The first network node of claim 4, wherein the CSI-RS comprises a 1 decibel compression point (P1 dB) CSI-RS, and wherein the P1 dB CSI-RS has a different PAPR than a conventional CSI-RS used for CSI determination.

6. The first network node of claim 1, wherein pilot signals of the reference signal are not precoded.

7. The first network node of claim 1, wherein each pilot signal of a plurality pilot signals of the reference signal corresponds to a different transmitter antenna of the second network node.

8. The first network node of claim 1, wherein the at least one processor is further configured to:

determine the compression point information based on the reference signal, wherein the compression point information includes multiple compression point values, and wherein each compression point value of the multiple compression point values corresponds to a particular transmit chain of a plurality of transmit chains of the second network node.

9. The first network node of claim 8, wherein to determine the compression point information based on the reference signal, the at least one processor is further configured to:

determine, for each transmitter of the first network node, the compression point information based on a subset of pilot tones of a CSI-RS.

10. The first network node of claim 8, wherein to determine the compression point information based on the reference signal, the at least one processor is further configured to:

determine, for each power amplifier of the first network node, the compression point information based on a subset of pilot tones of a CSI-RS.

11. The first network node of claim 8, wherein to determine the compression point information based on the reference signal, the at least one processor is further configured to:

determine a received power for each pilot signal of a CSI-RS and a corresponding expected power of each pilot signal;

determine, for one or more transmit chains of the plurality of transmit chains, a transfer function based on the received powers and the corresponding expected powers; and determine a 1 decibel compression point (P1 dB) point for the one or more transmit chains based on a corresponding transfer function of the transfer functions.

12. The first network node of claim 11, wherein to determine the transfer function, the at least one processor is further configured to:

interpolate the transfer function based on the received power of each pilot signal and the corresponding expected power.

13. The first network node of claim 11, wherein to determine the compression point information based on the CSI-RS, the at least one processor is further configured to:

equalize the received power of each pilot signal prior to the determination of the transfer function, wherein the transfer function is determined based on the equalized received power and the expected power.

14. The first network node of claim 11, wherein to determine the transfer function, the at least one processor is further configured to:

generate a plot of points based on the received powers and the corresponding expected powers; and determine a polynomial for the plot of points using a smooth transfer function, wherein the P1 dB point is determined based on the polynomial.

15. The first network node of claim 1, wherein to transmit the compression point information the at least one processor is configured to:

transmit a channel state feedback report including the compression point information.

16. The first network node of claim 1, wherein to transmit the compression point information the at least one processor is configured to:

transmit a plurality of compression point values, where each compression point value of the plurality of compression point values corresponds to a different transmitter of the second network node.

17. The first network node of claim 1, wherein the at least one processor is configured to:

receive, from the second network node, a second reference signal;

transmit second compression point information responsive to the second reference signal, wherein the second compression point information is determined based on the second reference signal; and receive a second transmission responsive to the second compression point information and in accordance with a second power allocation based on the transmission of the second compression point information.

18. The first network node of claim 17, wherein a first total power of the power allocation is the same as a second total power of the second power allocation.

19. A first network node for wireless communication, comprising:

at least one processor; and a memory coupled to the at least one processor, wherein the at least one processor is configured to:

transmit a reference signal;

receive, from a second network node, compression point information responsive to the reference signal, wherein the compression point information is determined based on the transmission of the reference signal; and transmit a transmission responsive to the compression point information and in accordance with a power allocation determined based on the compression point information.

20. The first network node of claim 19, wherein the reference signal comprises a plurality of unprecoded pilot tones.

21. The first network node of claim 19, wherein the reference signal comprises a channel state information reference signal (CSI-RS).

22. The first network node of claim 21, wherein the CSI-RS comprises a P1 dB CSI-RS, and wherein the at least one processor is configured to:

modify a conventional CSI-RS signal to generate the P1 dB CSI-RS; or select the a P1 dB CSI-RS from a pool of P1 dB CSI-RS; and generate a candidate CSI-RS and select the candidate CSI-RS as the P1 dB CSI-RS based on whether the candidate CSI-RS satisfies a PAPR condition.

23. The first network node of claim 19, wherein the at least one processor is configured to:

transmit a second reference signal to a third network node;

receive, from the third network node, second compression point information responsive to the second reference signal, wherein the second compression point information is determined based on the second reference signal; and transmit, to the third network node, a second transmission responsive to the second compression point information and in accordance with a second power allocation determined based on the second compression point information, wherein the second power allocation is different from the power allocation.

24. The first network node of claim 23, wherein a first total power of the power allocation is the same as a second total power of the second power allocation.

25. The first network node of claim 19, wherein the power allocation distributes a total transmit power unequally between transmitter antennas of the first network node.

26. The first network node of claim 19, wherein the at least one processor is configured to:

determine the power allocation based on the compression point information, wherein the power allocation allocates transmission power to each transmitter power amplifier of the first network node based on a corresponding linear region of each transmitter power amplifier.

27. The first network node of claim 26, wherein to determine the power allocation the at least one processor is configured to:

distribute transmission power from a total amount of allocated transmission power to linear regions of all the transmitter power amplifiers based on the compression point information;

determine a residual amount of unallocated transmission power based on the distributed transmission power for the linear regions of all the transmitter power amplifiers and based on the total amount of allocated transmission power; and distribute the residual amount of unallocated transmission power to one or more of the transmitter power amplifiers.

28. The first network node of claim 27, wherein to distribute residual amount of unallocated transmission power to the transmitter power amplifiers the at least one processor is configured to:

distribute the residual amount of unallocated transmission power to the transmitter power amplifiers equally.

29. The first network node of claim 27, wherein to distribute residual amount of unallocated transmission power to the transmitter power amplifiers the at least one processor is configured to:

distribute the residual amount of unallocated transmission power to the transmitter power amplifiers on a pro rata basis.

30. The first network node of claim 19, wherein the at least one processor is configured to:

determine the power allocation in association with a power distribution rule based on a vector set $\{C_i\}_{i=1}^{N_{Tx}}$ which satisfies a condition of $\sum_{i=1}^{N_{Tx}} [|C_i|]^2 = 1$, wherein '$C_i$' is a signal amplitude after power allocation and before power amplification of a transmit chain for the transmission, '$[|C_i|]^2$' is a signal power after power allocation and before power amplification of the transmit chain, '$N_{Tx}$' is a number of transmit antennas, and '$i$' is an index of the transmit chain.

* * * * *